United States Patent
Capps et al.

(10) Patent No.: US 7,386,784 B2
(45) Date of Patent: *Jun. 10, 2008

(54) UNIVERSAL MEDIA PLAYER

(75) Inventors: Steve Capps, San Carlos, CA (US); Timothy D Noonan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/083,684

(22) Filed: Mar. 17, 2005

(65) Prior Publication Data

US 2005/0166136 A1 Jul. 28, 2005

Related U.S. Application Data

(63) Continuation of application No. 09/746,640, filed on Dec. 21, 2000, now abandoned.

(51) Int. Cl.
*G06F 17/00* (2006.01)
*G06F 3/00* (2006.01)
*G06F 3/048* (2006.01)

(52) U.S. Cl. .............. 715/203; 715/200; 715/716; 715/719; 715/756; 715/783

(58) Field of Classification Search ............. 715/500.1, 715/200, 203, 716, 719, 756, 783
See application file for complete search history.

(56) References Cited

U.S. PATENT DOCUMENTS 6,102,287 A * 8/2000 Matyas, Jr. ................. 235/380
6,248,946 B1 * 6/2001 Dwek ............................ 84/609
6,564,380 B1 5/2003 Murphy
7,020,704 B1 * 3/2006 Lipscomb et al. .......... 709/226
2002/0004839 A1 * 1/2002 Wine et al. .................. 709/231
2002/0007418 A1 1/2002 Hegde et al .
2002/0055934 A1 5/2002 Lipscomb et al.
2002/0120879 A1 8/2002 Atkinson
2002/0133247 A1 9/2002 Smith et al.
2002/0143973 A1 10/2002 Price
2003/0072299 A1 4/2003 Hunt et al.
2004/0051812 A1 3/2004 Hayward

OTHER PUBLICATIONS

Jones et al., Special Edition Using Microsoft Frontpage 2000, Chapter 28—"Using Java Applets, Browser Plug-Ins, and ActiveX Controls" (Que Publishing, May 17, 1999).*

(Continued)

*Primary Examiner*—Doug Hutton
*Assistant Examiner*—Chau Nguyen
(74) *Attorney, Agent, or Firm*—Christensen O'Connor Johnson Kindness PLLC

(57) ABSTRACT

A universal media player designed to improve a user's online media experience that is preferably embedded in an Internet browser is disclosed. The universal media player allows a user to navigate between different sources of media without requiring the downloading of the media player associated with the format of the media source. The universal media player includes an interface with user-actuable control buttons, the universal media player determining whether incoming media is playable by the universal media player. If the incoming media is playable by the universal media player, the media is intercepted as the media is downloaded and redirected to the universal media player. Determining if the media is playable is accomplished by identifying the type of incoming media and searching a table of MIME media types.

16 Claims, 20 Drawing Sheets

OTHER PUBLICATIONS

Niederst, Web Design in a Nutshell, Chapter 20—"Video on the Web" (O'Reilly Publishing, © Nov. 1998).*

Oliver, Sams Teach Yourself HTML in 24 Hours, Fourth Edition, Hour 17—"Embedding Multimedia in Web Pages" and Hour 18—"Interactive Pages with Applets and ActiveX" (Sams Publishing, © Sep. 17, 1999).*

Bott et al., Special Edition Using Windows 98, Second Edition, Chapter 27—"Web Browsing with Internet Explorer 5.0" (Que Publishing, © Dec. 21, 1999).*

Jones et al., Special Edition Using Microsoft Frontpage 2000, Chapter 9—"Enhancing Web Sites with FrontPage Frames" (Que Publishing, May 17, 1999).*

Snell, N., *Sams Teach Yourself the Internet in 24 Hours*, 3d ed., Sams Publishing, 1999, Chap. 7, "Playing Online Video, Music and Broadcasts," 6 pages.

Cowart, R., and B. Knittel, *Special Edition Using Microsoft Windows 2000 Professional*, Que® Corporation, 2000, Chap. 12, "World Wide Web," 8 pages.

* cited by examiner

UNIVERSAL MEDIA PLAYER

CROSS-REFERENCE TO RELATED APPLICATION

This application is a continuation of application Ser. No. 09/746,640, filed Dec. 21, 2000 now abandoned, the benefit of the filing date of which is hereby claimed under 35 U.S.C. 120.

FIELD OF THE INVENTION

The present invention relates to computer software and, in particular, to multimedia players for online Internet use.

BACKGROUND OF THE INVENTION

Media designed for distribution over the Internet come in many forms and formats. Media players are software resident on computers that interpret incoming stream media and convert the media into human-perceivable form, i.e., into audio and video form for outputting to a user. What is common to each media player is a uniform media format and a unique user interface.

Because conventional Internet media players have their own unique media formats and user interfaces, in the past, media players have been incompatible. This incompatibility has created a variety of problems. For instance, if a user is sampling radio stations played by different media players, an undesirable amount of time is spent juggling the various players and waiting for them to cue up media. This is not conducive to providing simple background music. Even when the streaming media being downloaded has a universal file format, problems exist because each resident media player competes to register itself as being the owner of a given file format. For instance, almost all media players can play MP3 files as well as the private file format for which the player is expressly designed. When a user downloads streaming media having a particular file format, the user will be queried to download the media player associated with the format of the media. If the user selects to download the media player, the player installer will change the user's file associations. For instance, if a user has been using the WinAMP® media player and decides to receive a Real Network stream of media, the user will be asked if the Real Networks media player should be downloaded. If the user specifies that the Real Networks media player should be downloaded, the Real Networks media player installer will change a user's file associations so that the Real Networks media player will, in the future play every media type saved in the user's file. As a result, the user will lose the use of the WinAMP® media player.

In another scenario, a user may decide to listen to a first streaming media radio station. The user will have to locate the appropriate link and open the necessary media player to launch the application. After managing the windows on the screen to return the user to the "working" window, the user may decide to listen to a second streaming media radio station which may employ a different player. In order to change media players, the user must first open the original player window and activate the stop feature of the player's interface. Then, the user must locate the second streaming media radio station and activate the link to start the second media. If the media player employed by the second streaming media radio station is not installed, activating the link will prompt the user to install a second player. This entire process requires the user to manage multiple windows in order to listen to the second streaming media radio station. If the user forgets to stop the first media player, both media players will play simultaneously, leading to noise. Changing the volume level of one media player may or may not affect the other media player so the user may be forced to separately locate and adjust both players' volume control.

Accordingly, there is a need for a universal media player that improves a user's online media experience and eliminates the burdens discussed above that are placed upon a user when juggling media played by different media players. The present invention is directed to fulfilling this and other needs.

SUMMARY OF THE INVENTION

The present invention is directed to solving the above problems by providing a universal media player designed to improve a user's online media experience. The universal media player allows a user to navigate between different sources of media without requiring the downloading of the media player associated with the format of the media source. Preferably, the universal media player is "embedded" in another program, preferably, an Internet browser, such that the interface of the universal media player is persistent when the interface of the program within which the universal media player is embedded. In the case of a browser, preferably the interface of the embedded universal media player is normally positioned within the frame of the browser interface, i.e., a portion of the browser interface that normally does not change.

In accordance with the present invention a computer-implementable method of playing media designed for playing on various types of media players is provided. The method includes providing a universal media player that includes an interface with user-actuable control buttons, determining whether media to be downloaded associated with a dedicated media player is playable by the universal media player, and if the media to be downloaded associated with a dedicated media player is playable by the universal media player, intercepting the media as the media is downloaded and redirecting the media to the universal media player.

In accordance with other aspects of the present invention, a media type table of MIME is searched to determine whether the media to be downloaded associated with a dedicated media player is or is not playable by the universal media player.

In accordance with further aspects of the present invention, in response to a request to change a media source, the universal media player determines the MIME type of the new media and instantiates a media component object for the media. When the instantiated media component object is ready, a second media player is initialized, the first media player is stopped and hidden, and the second media player is displayed.

In accordance with yet other aspects of the present invention, the universal media player includes an interface that allows users to make selections by actuating user-actuable controls that form part of the universal media player interface.

In accordance with still other aspects of the present invention, two universal media players can be locked and synchronized together. Preferably, synchronization is accomplished by a first user clicking on a uniform resource locator (URL) media link of the user's universal media player after the user's universal media player is locked to a second user's universal media player. As a result, both universal media players receive the same media link, resulting in the users of both media players listening to the same sound or viewing the same video simultaneously. Alternatively, one user's universal media player can be the source of media played by a second user's universal media player. The locking and synchronizing of universal media players can also be used to provide video internet meeting conferencing.

The invention has a number of advantages and features many of which, like the foregoing, are intended to eliminate the need to have a handful of separate media players each with a user interface having different control buttons. The present invention provides the user with a single interface having one set of control buttons (e.g. play, stop, volume, next and previous track) regardless of the source of media, providing the user with an uncluttered desktop. The interface is in a form that facilitates managing the user's online media experience even while using the media player in the background. As noted above, preferably, a universal media player formed in accordance with this invention is embedded in an Internet browser.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a universal media player designed to improve a user's online experience. As will be better understood from the following description, the universal media player allows a user to navigate between different sources of media without requiring the downloading of the media player associated with the format of the media source. Preferably, the universal media player is "embedded" in another program, preferably, an Internet browser, such that the interface of the universal media player is persistent when the interface of the program within which the universal media player is embedded. In the case of a browser, preferably the interface of the embedded universal media player is normally positioned within the frame of the browser interface, i.e., a portion of the browser interface that normally does not change.

Figure 1:
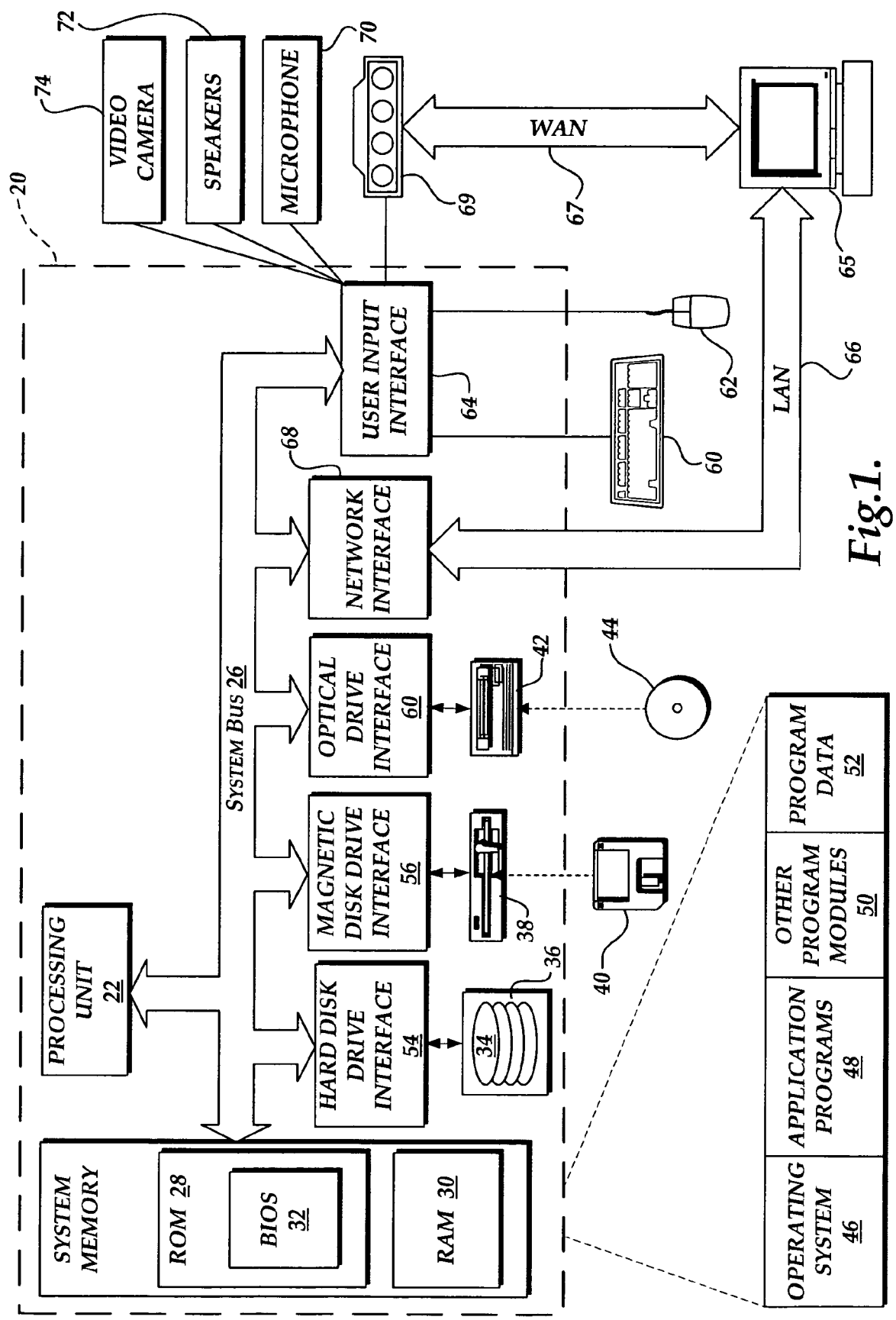
FIG. 1 is a block diagram of a personal computer system suitable for implementing an embodiment of the present invention.

The invention is preferably practiced in the context of an operating system resident on a personal computer. FIG. 1 illustrates a typical hardware configuration of a personal computer suitable for implementing a universal media player formed in accordance with the present invention. The personal computer illustrated in FIG. 1 includes a central processing unit 22, such as a conventional microprocessor, and a number of other units interconnected via a system bus 26. The system bus 26 may be any of several types of bus structures, including a memory bus or memory controller, a peripheral bus, and a local bus using any of a variety of bus architectures. The computer 20 shown in FIG. 1 includes a system memory 24 comprised of non-volatile and volatile memory such as Random Access Memory (RAM) 30, Read Only Memory (ROM) 28, and Basic Input/Output System (BIOS) 32. The illustrated computer 20 also includes a hard disk drive interface 54 for connecting a Compact Disk (CD) drive 34, a magnetic disk driver interface 56 for connecting a magnetic disk drive 38, an optical drive interface 60 for connecting a Digital Versatile Disk (DVD) 42, and a user input interface 64 for connecting peripheral devices such as a keyboard 60, a mouse 62, a microphone 70, speakers 72, and a video camera 74. The computer 20 has resident thereon an operating system 46 such as Microsoft's WINDOWS 2000®, application programs 48, other program modules 50, and program data 52.

The computer 20 may operate in a network environment using logical connections to one or more remote computers 65. The remote computer 65 may be a personal computer, a server, a router, a network PC, or other common network nodes. The logical connections include a local area network (LAN) 66 and a wide area network (WAN) 67, but also include other networks. Such network environments are commonplace in office, enterprise-wide computer networks, intranets and the Internet. When used in a LAN network environment, the computer 20 is connected to the LAN 66 through a network interface adapter 68. When used in a WAN network environment, the computer 20 includes a modem 69 or other means for establishing communications over the WAN 68, such as the Internet.

As is well understood by those skilled in the art, the World Wide Web (WWW) is a vast collection of interconnected documents, many written in various MIME types that are electronically stored at WWW sites throughout the Internet. MIME is the acronym for Multipurpose Internet Mail Extensions, and is a protocol widely used on the Internet that extends the Simple Mail Transfer Protocol (SMTP) to permit data, such as video, sound, and binary files, to be transmitted by Internet e-mail without having to be translated into ASCII format first. In other words, MIME types describe the contents of a document to a MIME compliant receiving application. The receiving application refers to a standardized list of documents that are organized into MIME types and subtypes to interpret the content of the file. An example of a MIME type of text refers to a file that contains text written in HyperText Markup Language (HTML). The MIME types are electronically stored at WWW sites throughout the Internet. A WWW site is a server connected to the Internet that has mass storage facilities for storing media and hypertext documents. Also, a WWW server runs administrative software for handling requests for the stored media. A hypertext document normally includes a number of hyperlinks that may be identified in various ways (e.g., highlighted portions of text) which link the document to other hypertext documents possibly stored at a WWW site elsewhere on the Internet. Each hyperlink is associated with a Uniform Resource Locator (URL) and provides the exact location of the linked document on a server connected to the Internet and describes the document. Thus, whenever a hypertext document is retrieved from any WWW server, the document is considered to be retrieved from the WWW. As is well known to those skilled in the art, a WWW server may also include facilities for storing and transmitting application programs, which are application programs written in JAVA™ programming language from Sun Microsystems, for execution on a remote computer. Likewise, a WWW server may also include facilities for executing scripts or other application programs on the WWW server itself.

A consumer or other remote user may retrieve a media stream from the WWW via a WWW (Internet) browser application. The WWW (Internet) browser is a software application program for providing a graphical user interface to the WWW. Upon request from the consumer via a WWW (Internet) browser, the browser accesses and retrieves the desired media stream from the appropriate WWW server using the URL for the media and a protocol known as MIME which is a protocol that is part of HyperText Transfer Protocol (HTTP). HTTP is a higher level protocol than TCP/IP and is designed specifically for the requirements of the WWW. It is used on top of TCP/IP to transfer hypertext or media-related documents between servers and clients. The WWW (Internet) browser may also retrieve application programs from the WWW server, such as JAVA™ applets, for execution on the client computer.

The present invention relates to a method for providing a universal multimedia player for online Web (Internet) use. As will be readily understood by one skilled in the relevant art, the present invention is not limited in its application to an Internet browser. Thus, it is to be understood that the disclosed embodiment is only by way of example and should not be construed as limiting. Preferably, the present invention is implemented in an object-oriented programming language such as C++ using object-oriented programming techniques. As will be understood by those skilled in the art, Object-Oriented Programming (OOP) objects are software components comprising data structures and member functions which comprise operations on the data. Together, these elements of the components enable objects to model virtually any real-world entity in terms of its characteristics, represented by its data elements, and its behavior, represented by its data manipulation functions. The basic principles and benefits of object-oriented programming are encapsulation, polymorphism and inheritance. Objects hide, or encapsulate, the internal structure of their data and the algorithms by which their functions work. Instead of displaying or exposing these implementation details, objects present interfaces that represent their abstractions. Polymorphism is when a software component can make a request of another software component without knowing exactly what that component is. The component that receives the request interprets it and determines according to its variables and data how to execute the request. Inheritance allows developers to reuse pre-existing design and code. Through inheritance, developers can derive subclasses that inherit behaviors of other software component objects, which a developer then customizes to meet particular needs. Accordingly, in the present invention a media component object is created to model aspects of presenting media. An example of an object-oriented component base class that is used as a foundation for presenting media is Microsoft® COM (Component Object Model). As will be understood by those skilled in the art, COM components are written in object-oriented languages such as C++ and are the foundation of the OLE (Object Linking and Embedding), ActiveX, and DirectX specifications, where ActiveX® is a set of technologies that enable software components to interact with one another in a networked environment like the Internet. The ActiveX® controls are reusable software components based on Microsoft® ActiveX® technology that is used to add interactivity and more functionality, such as a popup menu, to a Web page, applications, and software development tools. An ActiveX® control can be written in any number of object-oriented languages such as C++, JAVA™, or Visual Basic®. Thus, ActiveX® controls can be embedded in Web pages to produce animation and other multimedia effects, interactive objects and other applications. Furthermore, DirectX® is a Windows® application programming interface (API) that gives applications direct access to a computer's sound and graphics hardware. DirectX® includes a number of components: to name a few, DirectDraw® for graphics, DirectSound® for audio, and Direct3D® for three-dimensional graphics.

Figure 2:
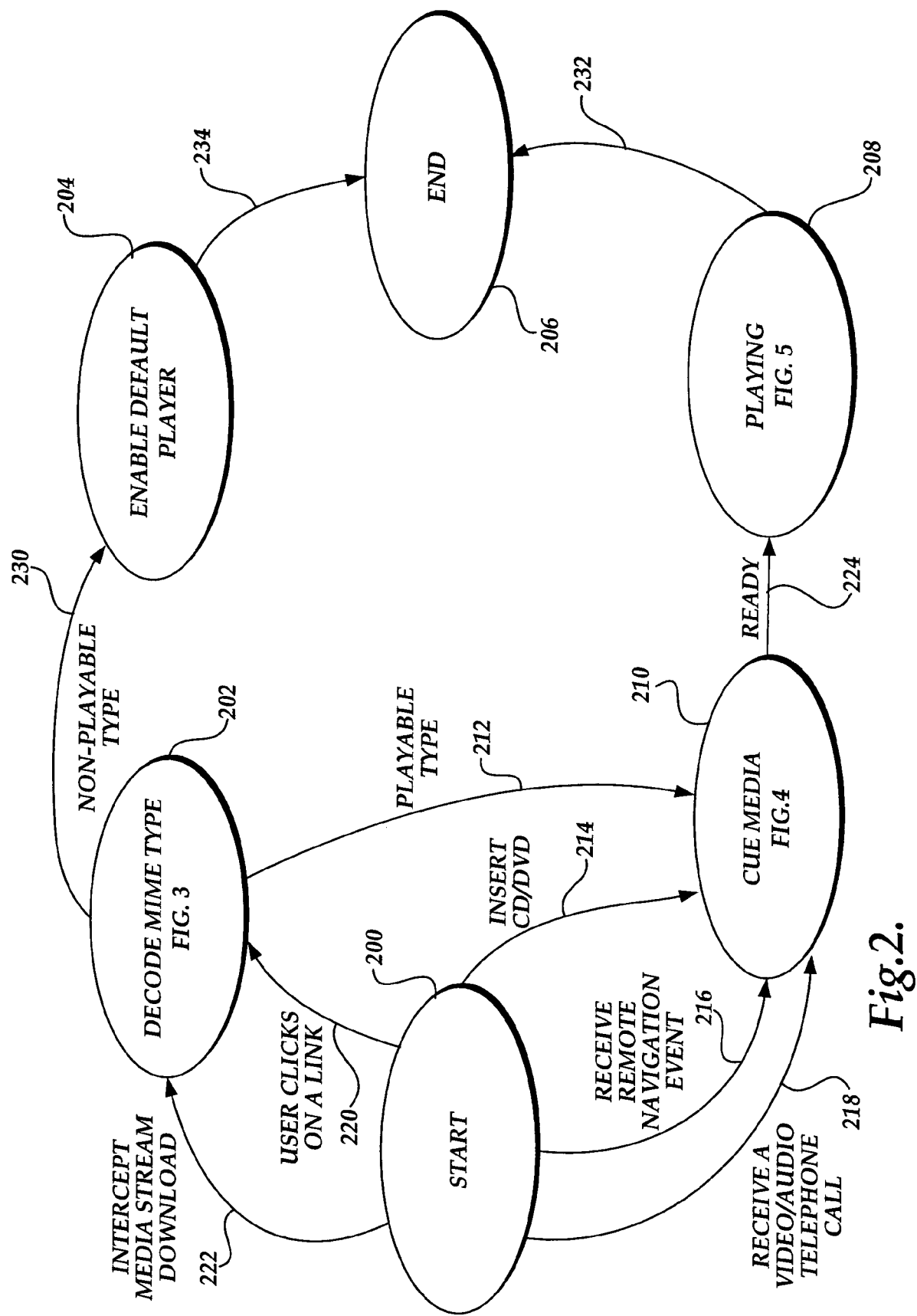
FIG. 2 is a state activity diagram that illustrates the general operation of a universal media player formed in accordance with the present invention.

FIG. 2 is a state activity diagram that illustrates the general operation of a universal multi-media player formed in accordance with the present invention. As will be understood by those skilled in the art, a state activity diagram is used to illustrate the performance of an object or a state. Included in the state activity diagram are labeled events of transitions that show what event or activity occurs between the various states. According to one actual embodiment of the present invention, object-oriented software component states, also known as member functions, are provided for performing start 200, decode MIME type 202, enable default player 204, cue media 210, playing 208, and end 206.

Beginning with start state 200, a user starts an online media experience by performing any number of activities or events relating to media. For example, a user may choose to click on a Uniform Resource Link (URL) or a user (or the system) may open a window that includes an embedded media player dedicated to playing specific media. The end result is the interception of a media stream download. Either type of occurrence activates a transition 220, 222 from the start state 200 to the decode MIME type state 202. If the media is playable by the universal media player, the universal media player transitions 212 from the decode MIME type state 202 to the cue media state 210. If the media is not playable by the universal multimedia player, the universal multimedia player transitions 230 to the enable default player state 204.

In contrast to the foregoing transitions, if the start activity is the insertion of CD or DVD media, the reception of a remote navigation event (described below), or the receipt of a video and/or telephone call, the embedded universal media player transitions 214, 216, or 218 directly from the start state 200 to cue media state 210.

When the media is ready for playing, the universal media player transitions 224 from the cue media state 210 to the playing state 208. The playing state includes a number of member functions for playing the media stream that depend to some extent on the nature of the media stream. After the media stream is completed, the universal media player transitions 232 from the playing state 208 to the end state 206 where the media experience ends. Likewise, if the media stream was a non-playable type, enabling default player state 204, when the non-playable media stream ends, the universal media player transitions 234 from the enable default player state 204 to the end state 206 where the online media experience ends.

Figure 3:
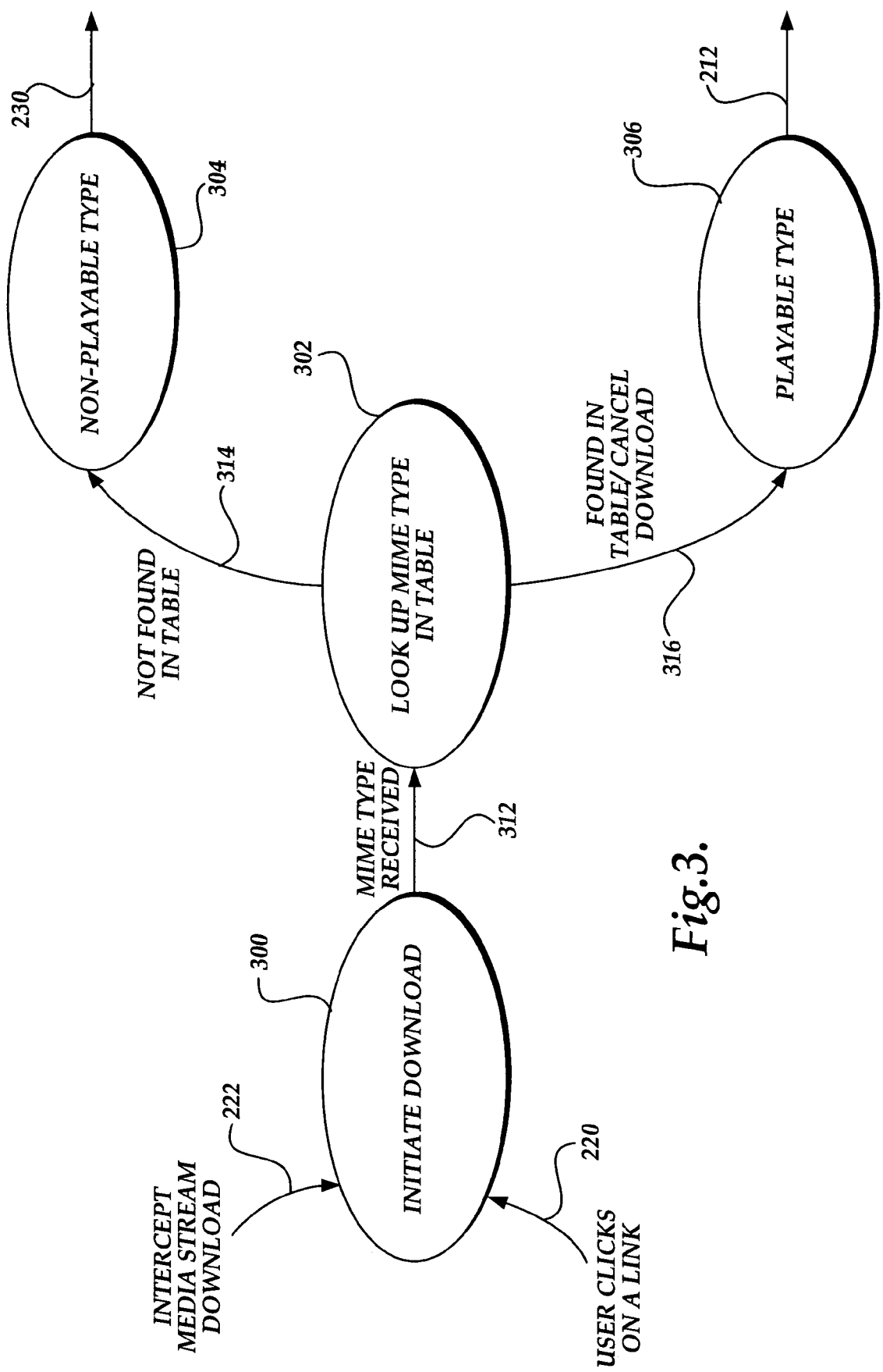
FIG. 3 is a state activity diagram that illustrates decoding a media source MIME type suitable for use in FIG. 2.
Figure 4:
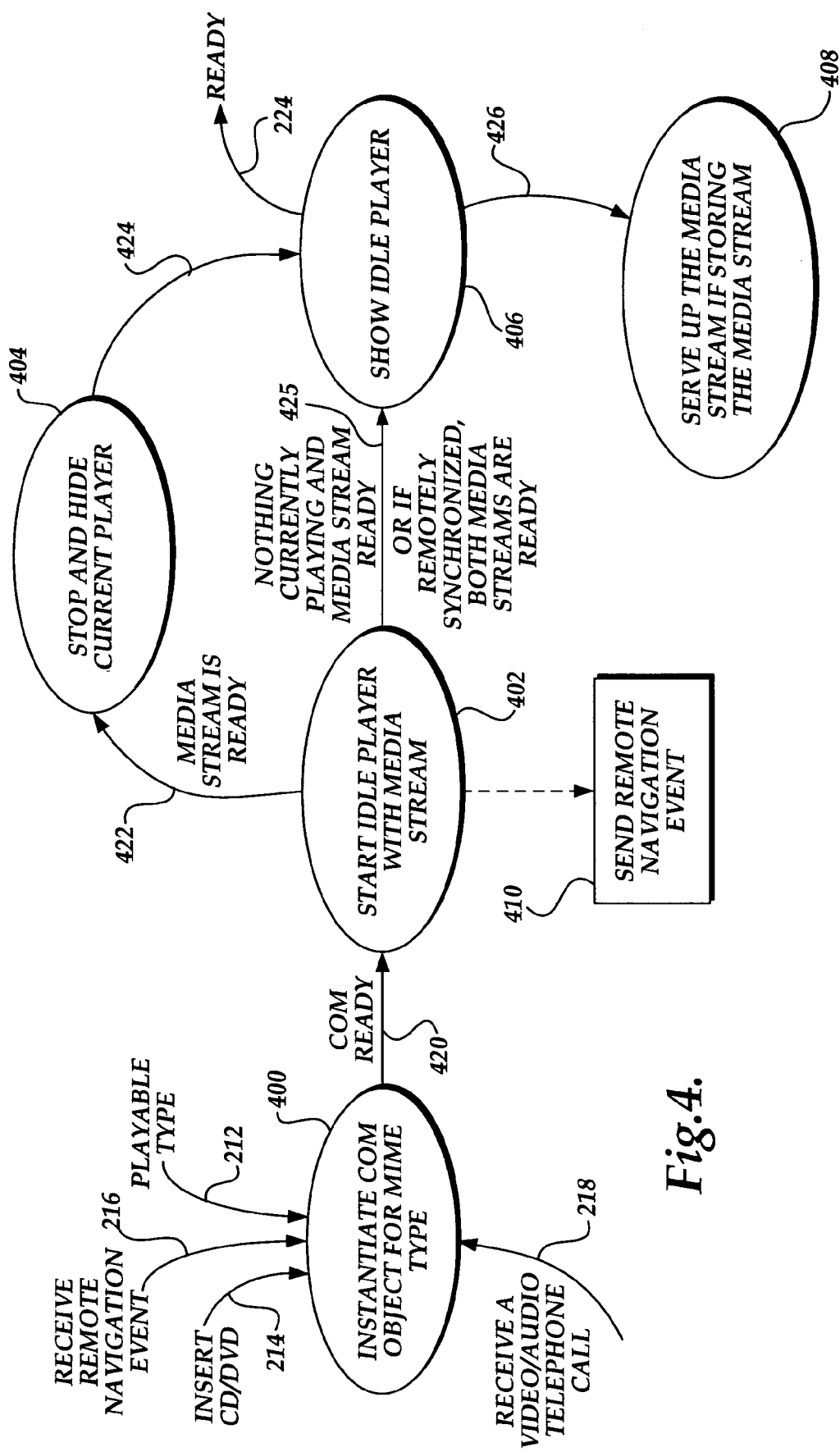
FIG. 4 is a state activity diagram that illustrates cueing media suitable for use in FIG. 2.
Figure 5:
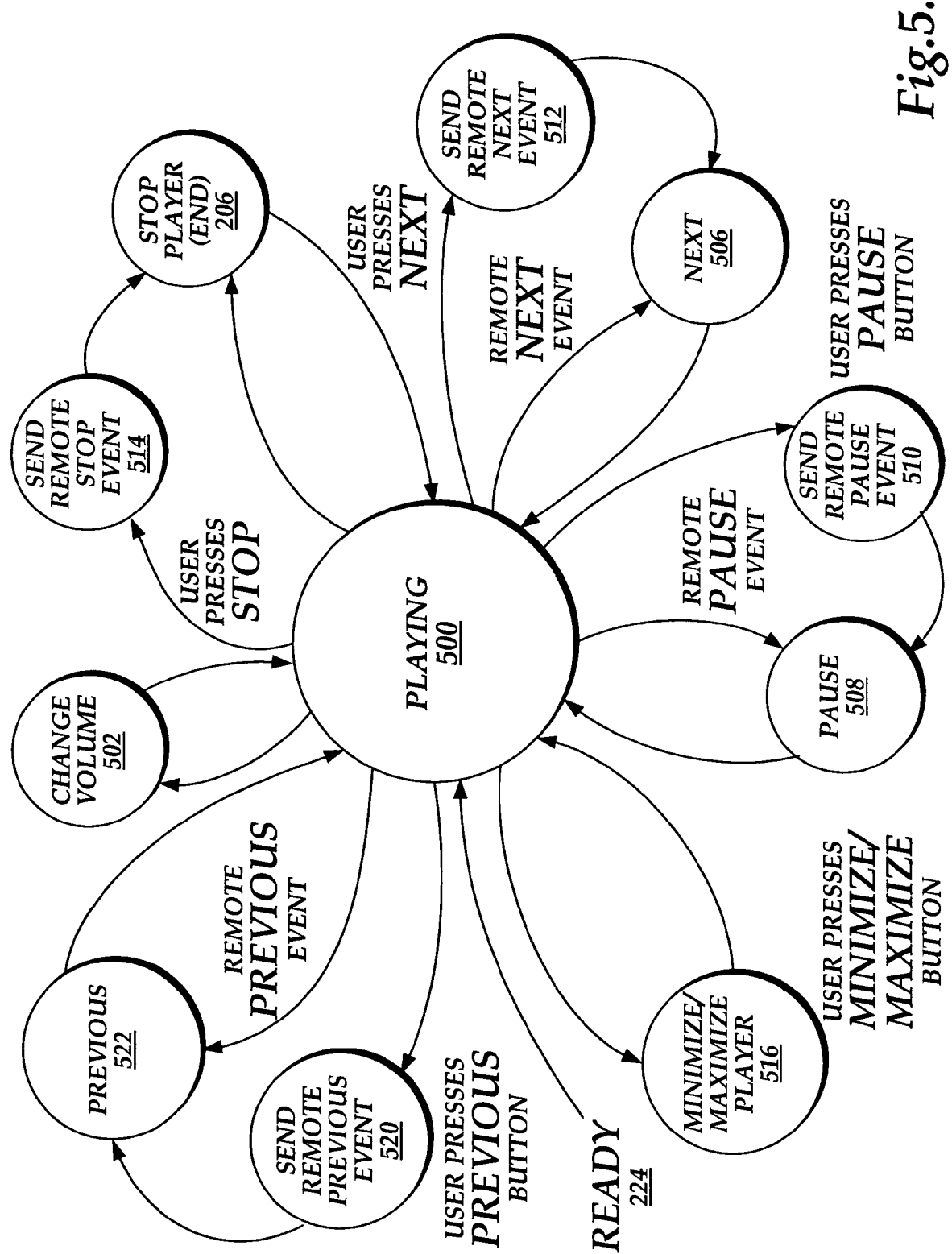
FIG. 5 is a state activity diagram that illustrates playing media suitable for use in FIG. 2.

In order to better understand the operation of a universal media player formed in accordance with this invention, the decode MIME type, cue media, and playing states are illustrated in FIGS. 3, 4, and 5, respectively, and described below. As with FIG. 2, these figures are in the form of object-oriented software components, also known as member functions. In essence, they are objects of the embedded universal media software component object.

Decode MIME Type

The decode MIME-type software component object (FIG. 3) states include initiate download 300, look up MIME type in table 302, non-playable type 304, and playable 306. As shown in FIG. 2 and repeated in FIG. 3, the initiate download state 300 is entered when a media stream download is intercepted 222 or a user clicks on a link 220. The MIME-type received download is analyzed by the decode MIME-type software component object transitioning 312 to the look up MIME type in table state 302. The analysis is performed by searching a look-up table of various MIME types and identifying the MIME type as one that is playable or non-playable by the media player. If the MIME type is not found in the table the media stream is non-playable by the media player. As a result, the decode MIME-type software component object transitions 314 to the non-player type state 304. If the MIME type is found in the table, the download of the media stream is canceled and the decode MIME-type software component object transitions 316 to the playable-type state 306. Thus, playable type is defined as a MIME type that the universal media player has found within the look-up table. As illustrated in FIG. 2 and described above, if the MIME type is a non-playable type, media playing defaults to a resident media player, having the ability to play the media, which could involve downloading another media player from a remote server.

Cue Media

The cue media (FIG. 4) software component object states include instantiate COM object for MIME type 400, start idle player with media stream 402, stop and hide current player 404, show idle player 406, and serve up the media stream if storing the media stream 408. As shown in FIG. 2 and repeated in FIG. 4, in response to the insertion of a CD/DVD 214, receiving a remote navigation event 216, receiving a video/audio telephone call 218, and receiving a playable type media stream 212, the cue media software object components enters the instantiate a COM object for the MIME-type state 400 that is associated with the media stream. Instantiation is defined as creating a media object component with member functions to control the media object. Typically, a media component object is an object-oriented software component base class or foundation consisting of member functions of subclasses or other components relating to media that control the media component. As will be understood by those skilled in the art, examples of software components relating to media member functions are audio, speaker, audio play, video, and video play.

When the COM object for the MIME type has been instantiated, the cue media software object component transitions 420 to the start idle player with media stream state 402. If the current media player is synchronized together with a second media player, a remote navigation event 410 is sent to the second media player.

When the media stream is ready, the cue media software object component transitions 422 to the stop and hide current media player state 404. If media is currently playing, this transfer causes the current media player to stop and be hidden. Then, the cue media software object component transitions 424 to the show idle player state 406. From the show idle player state, the cue media software object component transitions 426 to the serve up the media stream if storing the media stream state 408. As is understood to one skilled in the art of object-oriented programming, hiding an application temporarily removes the onscreen display of an application's active window while leaving the application running. Here, stopping inhibits an audio output if one is being generated.

If a current media player is not executing when the media stream is ready or if a current media player is remotely synchronized with a second media player and both media streams are ready, the cue media software object component transitions 425 directly to the show idle player state 406 from the start idle media player with media stream state 402. Then the cue media software object component transitions to the serve up the media stream if storing the media stream state 418.

Playing

The playing software component object (FIG. 5) states include playing 500, change volume 502, STOP player (END) 504, NEXT 506, PAUSE 508, send remote PAUSE event 510, send remote NEXT event 512, send remote STOP event 514, MINIMIZE/MAXIMIZE player 516, send remote PREVIOUS event 520, and PREVIOUS 522. When the universal media player transitions to the playing state 208 (FIG. 2), the playing software component object enters the playing state 500. From the playing state 500, a user can cause the playing software component object to transition to any of the other states by selecting the appropriate one of a number of control operations or events such as change volume, stop, next, pause, previous, and play. Enabling one of these control operations using a mouse or other cursor control device in a conventional manner causes the illustrated transition to take place. These events are similar to controls on a CD player, or VCR, etc. The control events also include minimize/maximize player interface window 516. Some additional events allow communication between two media players synchronized together. These include receiving and sending remote pause events 510, receiving and sending remote next events 512, receiving and sending remote previous events 520, and receiving and sending remote stop events 514. The nature and operation of the depicted events will be better understood from the following description and the accompanying functional logic interface screen figures.

Activate a Media Player Process

Figure 6:
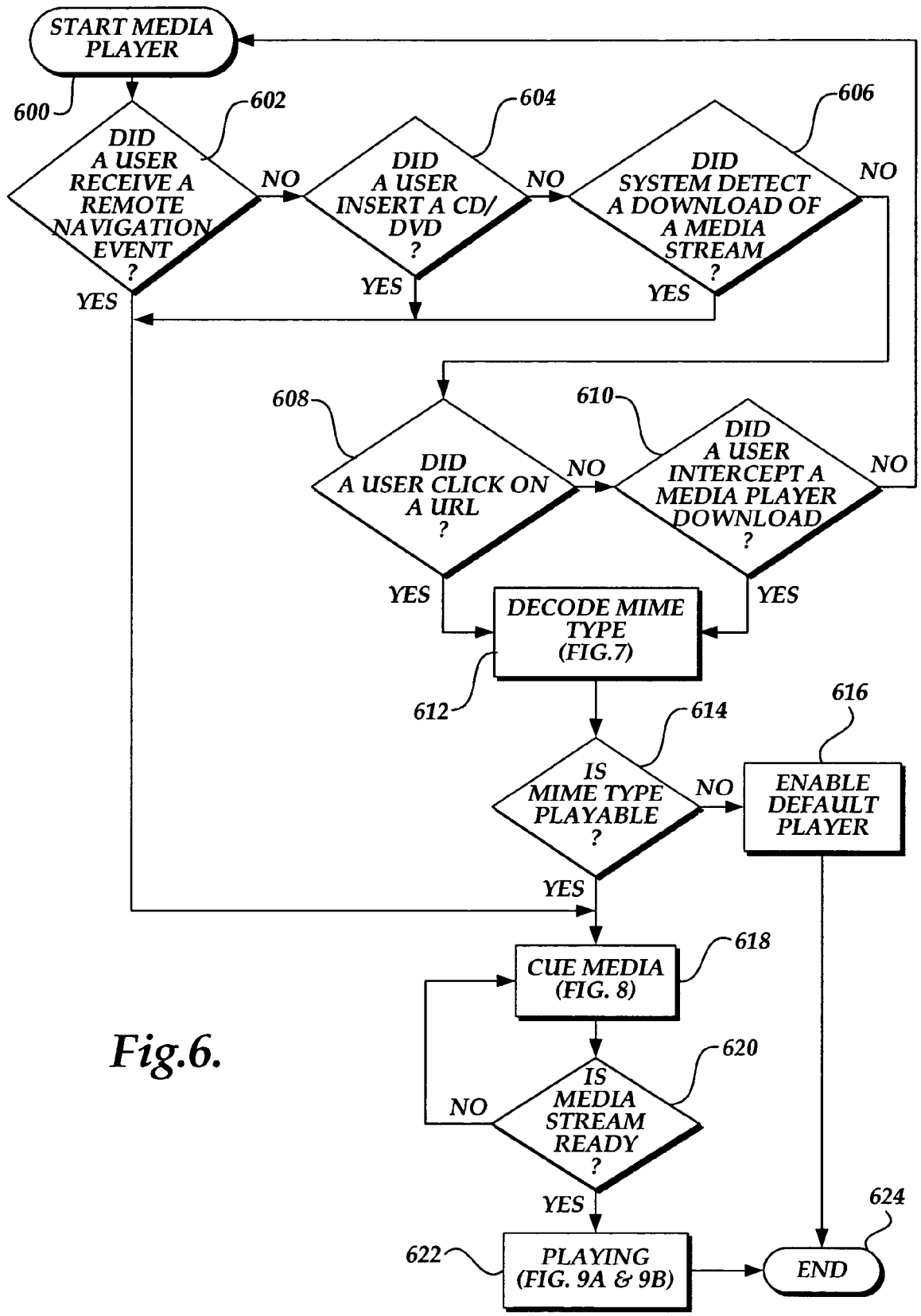
FIG. 6 is a flowchart illustrating a universal media player formed in accordance with the present invention.
Figure 8:
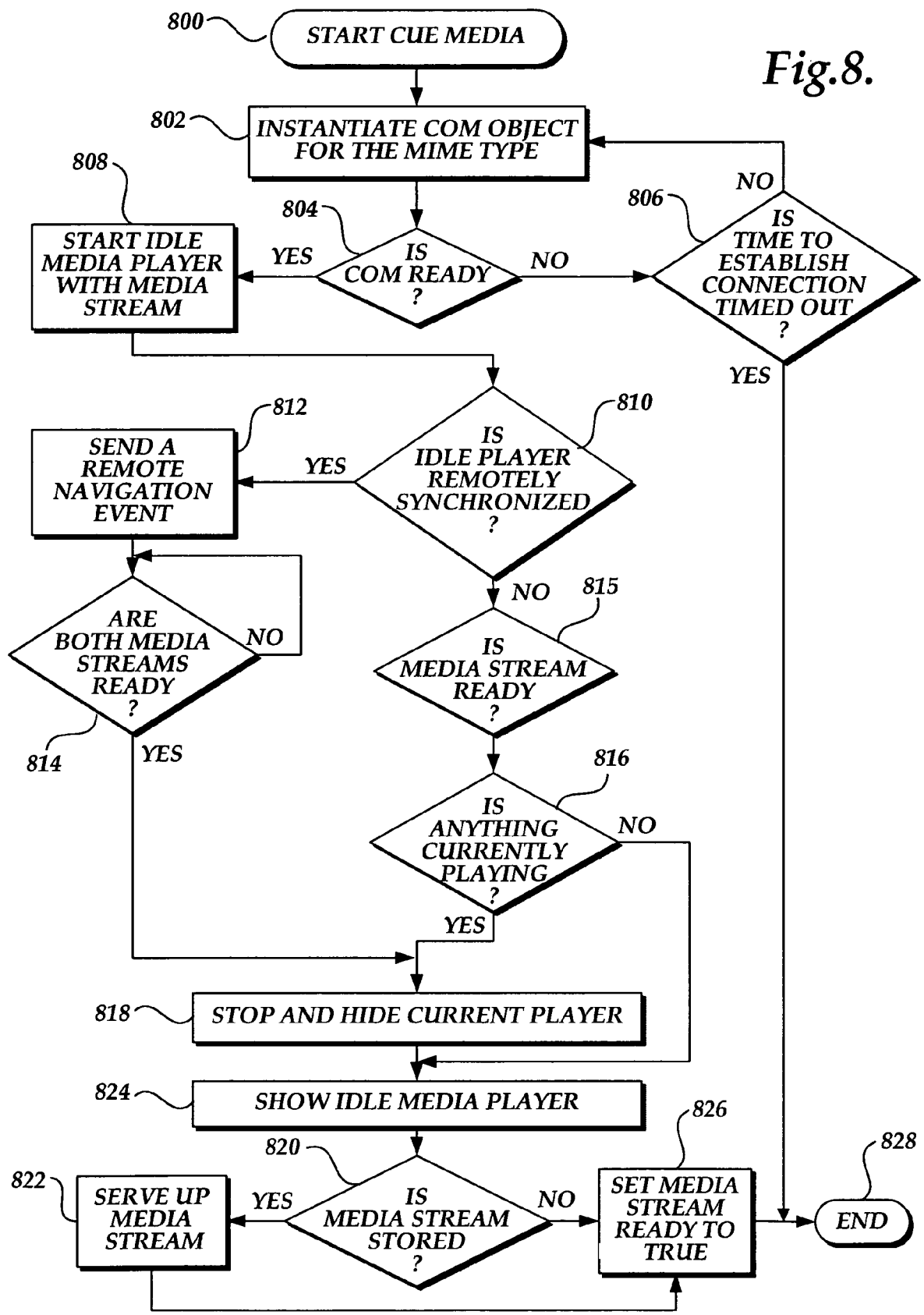
FIG. 8 is a flowchart illustrating logic for cueing the media stream suitable for use in FIG. 6.
Figure 9A:
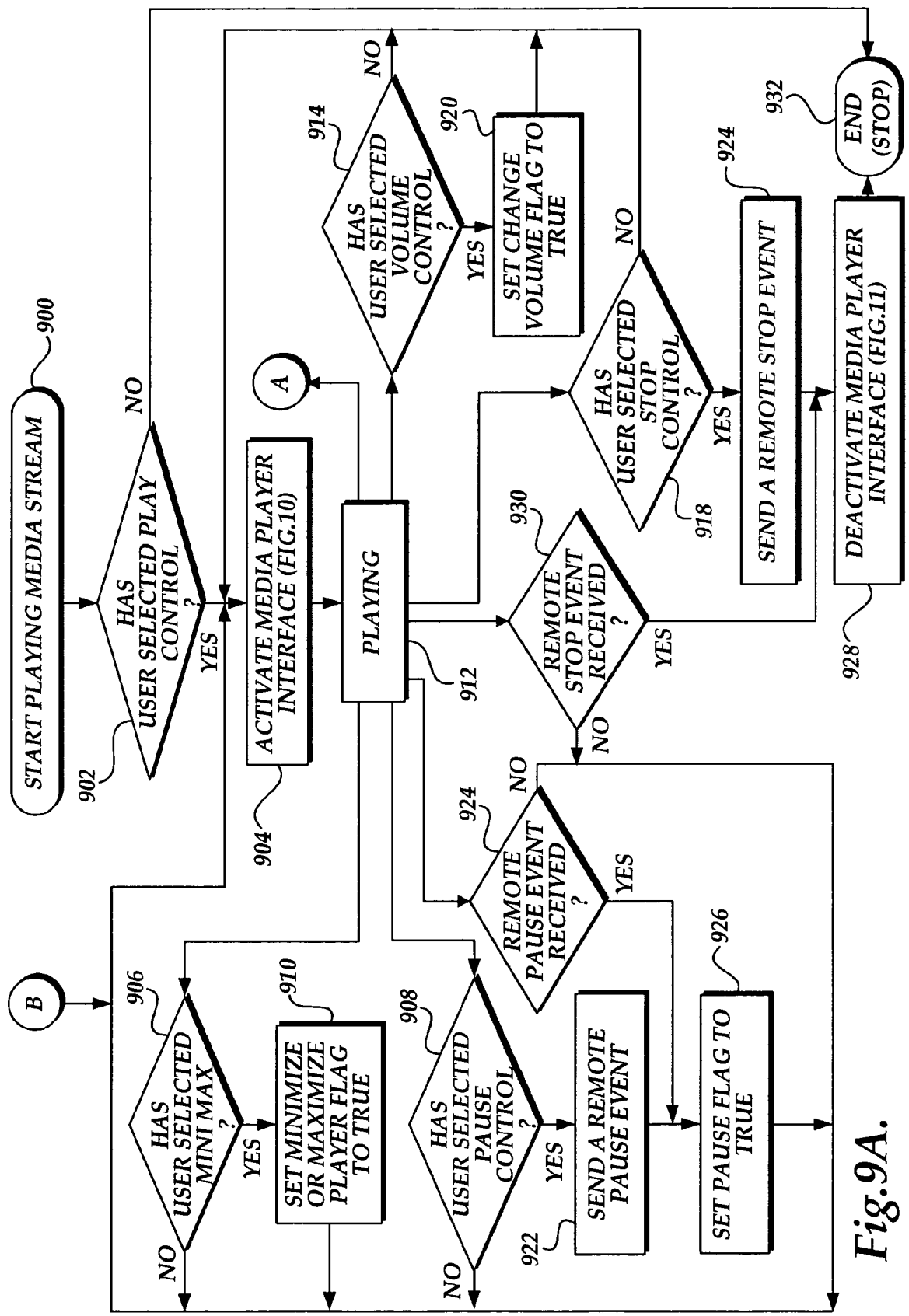
FIGS. 9A and 9B are flowcharts illustrating logic for activating a universal media player interface and causing the universal media player to play the media stream suitable for use in FIG. 6.
Figure 9B:
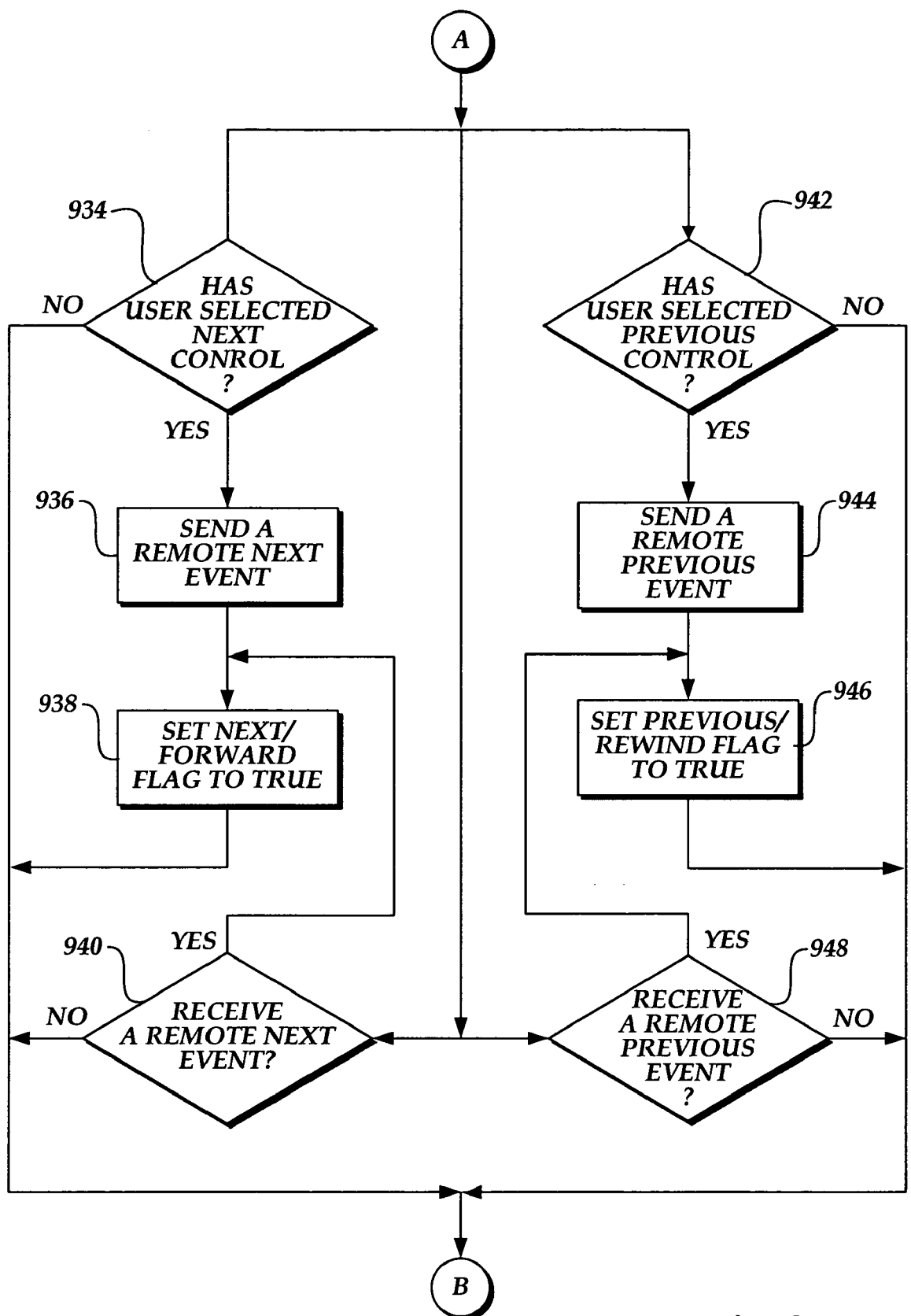

FIG. 6 is a recursive logic flowchart showing how a universal media player is activated in accordance with a preferred embodiment of the present invention. After processing commences, block 600, control immediately passes to decision block 602, where a test is performed to determine if a user received a remote navigation event. A remote navigation event occurs when two media players are synchronized together. In one form, one computer is the server while the other computer is dependent upon the other. This allows both users to browse and to simultaneously play the same media stream provided by a remote source. Alternatively, the one media player can function as the media source and the other media player receive media being played by the source media player. If a remote navigation event has been received, at function block 618, the media stream is cued and control is passed to decision block 620. (How media is cued is illustrated in FIG. 8 and described below.) At decision block 620 a test is performed to determine if the media stream is ready. When the media stream is ready, at function block 622, the universal media player is enabled to activate its interface and play the media. (How media is played is illustrated in FIGS. 9A and 9B and described below.) After playing ends by, for example, a user activating a stop button, control passes to end block 624.

If the user did not receive a remote navigation event, program control cycles to decision block 604 where a test is performed to determine if a user inserted a CD or DVD. If the user inserted a CD or DVD, at function block 618, the media stream is cued and control is passed to decision block 620. As before, when the media stream is ready, at function block 622, the universal media player is enabled to play the media. When the media ends, control passes to end block 624.

If the user did not insert a CD or DVD, program control cycles to decision block 606, where a test is performed to determine if a user received a video telephone call. An example of the video telephone program that can be used with the present invention is Windows NetMeeting™. If the user received a video telephone call, at function block 618, the telephone call media stream is cued and program control is passed to decision block 620. As before, when the media stream is ready, at function block 622, the universal media player is enabled to play the media, i.e., provide audio and video output. When the video telephone call ends, program control passes to end block 624.

Figure 7:
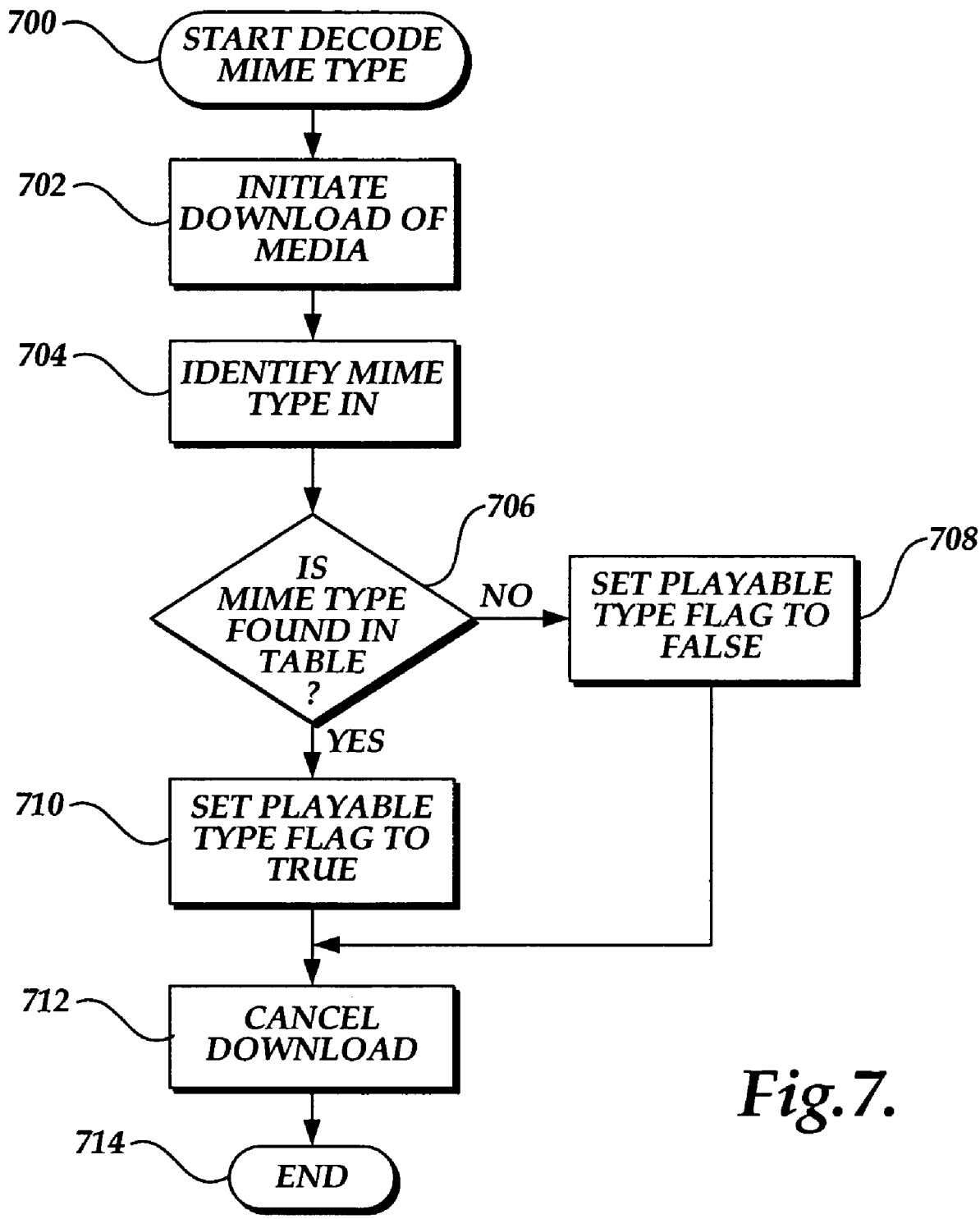
FIG. 7 is a flowchart illustrating logic for decoding the MIME type of the media stream suitable for use in FIG. 6.

If the user did not receive a video telephone call, control cycles to decision block 608 where a test is made to determine if a user clicked on a uniform resource link (URL). If the user clicked on a URL, at function block 612, the MIME type of the media stream associated with the URL is described. As noted above, MIME is an acronym for Multipurpose Internet Mail Extensions. As is known to those skilled in the Internet art, MIME types are extensions of the SMTP (Simple Mail Transfer Protocol) that permit data, such as video, sound, and binary files, to be transmitted without having to be translated into ASCII format first. MIME types describe the contents of the document. MIME is part of HTTP, and both Web browsers and HTTP servers use MIME to interpret e-mail files they send and receive. (How MIME types are decoded is illustrated in FIG. 7 and described below.) After the MIME type is decoded, at decision block 614, a test is made to determine if the identified MIME type is playable by the media player. If the universal media player is not able to play the MIME type associated with the media stream, a default media player capable of playing the media is enabled. See block 616. As is conventional, if the default media player is not resident on the computer, a download window may open to allow the user to download a copy of the default media player. When use of the default media player ends, by, for example, a user activating a stop button, the media stream ending, etc., program control passes to end block 624. If the MIME type is playable, at function block 618, the media stream is cued and control is passed to decision block 620. As before, when the media stream is ready, at function block 622, the universal media player is activated to play the media stream. When the media stream ends, a user activates a stop button or some other termination action occurs, program control passes to end block 624.

If the user did not click on an URL, program control passes to decision block 610, where a test is performed to determine if the system detected a download of a media stream. This could occur, for example, by the system opening a window having an instance of a player embedded in the window. If the system detects a media stream download, at function block 612, the MIME type associated with the media stream is decoded. Then, as before, at decision block 614, a test is performed to determine if the identified MIME type is playable by the media player. If so, also as before, at function block 618, the media stream is cued, program control is passed to decision block 620, and the media stream is played (block 622). If the universal media player is not able to play the MIME type associated with the media stream, then as before (function block 616), a default media player is enabled. Program control passes to end block 624 when media stream processing ends.

If the system did not detect a media stream download, the foregoing cycle is repeated.

Decode MIME Type Process

FIG. 7 is a flowchart illustrating logic for decoding the MIME type of the media stream suitable for use in FIG. 6. Processing commences at block 700 and immediately passes to function block 702 where a download of the media is initiated. Then, at function block 704, the download is analyzed to determine the MIME type. Then a test is performed at decision block 706 to determine if the MIME type is playable by the universal media player. More specifically, the identified MIME type is compared to playable MIME types stored in a look-up table. If the MIME type is playable, i.e., included in the table, program control is passed to function block 710 where a playable-type flag is set to true. Then the program control is passed to function block 712 where the download is canceled. Then, at block 714, processing ends. However, if the MIME type is not playable by the universal media player, program control is passed to function block 708 where the playable type is set to false. Then the download ends (block 712) and processing terminates (block 714).

Cue Media Stream Process

FIG. 8 is a flowchart illustrating logic for cueing a media stream suitable for use in FIG. 6. Processing commences at block 800 and immediately passes to function block 802 where a COM object for the MIME type is instantiated. Then, program control is passed to a decision block 804 where a test is made to determine if the COM object is ready. The COM object is ready when it has established a connection. If COM is not ready, control is passed to decision block 806 where a test is made to determine if the time to establish connection has timed out. If not, then program control is passed back to function block 802 to continue the instantiation of the COM object for the MIME type. If the time to establish connection times out before the COM object is ready, control passes to block 828 where processing ends.

If the COM object is ready before time out occurs, program control is passed to function block 808 where an idle universal media player is started with the media stream. Next, control is passed to a decision block 810 where a test is made to determine if the started idle universal media player is remotely synchronized. If the idle universal media player is remotely synchronized, program control is passed to function block 812 where a remote navigation event is sent. Next, control is passed to a decision block 814 where a test is made to determine if both media streams are ready. When both media streams are ready, program control is passed to function block 816 and processing continues in the manner described below. If both media streams are not ready, the test performed by decision block 814 is repeated.

If the idle player is not remotely synchronized (block 810), a test is made at decision block 815 to determine if the media stream is ready. If the media stream is ready, program control is passed to function block 816 and processing continues in the manner described below. If the media stream is not ready, the test performed by decision block 815 is repeated.

When the media stream or streams are ready (block 814 or block 815), a test is performed at decision block 816 to determine if anything is currently playing. If the media stream is ready and nothing is currently playing, program control is passed to function block 824 where the interface of the idle universal media player is shown, i.e., displayed. If the media stream is ready and a media stream is playing on a media player, program control is passed to function block 818 where the current media player is stopped and hidden. Program control then passes to function block 824.

Next, program control is passed to decision block 820, where a test is performed to determine if the media stream is stored. If the media stream is stored, program control is passed to function block 822 where the media stream is served up. Program control then passes to function block 826 where a media stream ready flag is set to true. The media stream could be stored at a server site or local disk drive. If the media stream is not stored, program control is passed directly to function block 826 where the media stream ready flag is set to true. After the media stream ready flag is set to true, program control is passed to end block 826 and processing ends.

Activate Universal Media Player Media Process

FIGS. 9A and 9B are flowcharts illustrating recursive logic for activating the universal media player interface and causing the universal media player to play a media stream suitable for use in FIG. 6. Processing commences at block 900. Program control immediately passes to decision block 902 to determine if a user has selected the play control button of the universal media player interface which at this point is idle. If the user has not selected the play control button, which is the only button of the idle universal media player interface that is enabled at this time, program control is passed to block 932, which causes a recursive call to be made to start block 900 of the logic illustrated in FIG. 9A.

If the user has selected the play control button, program control is passed to function block 904 where the universal media player interface is activated. (Logic for activating the media player interface is illustrated in FIG. 10 and described below.) Processing continues to function block 912 where the media stream is played by the universal media player. As discussed above and shown in FIG. 5, when the universal media player is activated a user has various controls available, which are depicted by several decision blocks in FIGS. 9A and 9B. The decision blocks respond to user-selected media player interface controls, such as minimize/maximize media player interface, volume, stop, previous, next and next. In addition to these decision blocks additional decision blocks determine if remote media player interface events such as pause, stop, previous, and next have been received.

At decision block 906, a test is performed to determine if the user selected minimize or maximize. If the user has selected minimize or maximize program, control passes to function block 910, where a minimize or maximize player flag is set to true, which results in a drop-down menu being displayed to allow a user to increase or decrease the size of the universal media player interface as illustrated in FIG. 17B and described below. Then, program control returns to block 912. If the user did not select minimize or maximize program, control returns immediately to block 904.

At decision block 908, a test is performed to determine if a user selected pause control. If the user selected pause control program, control passes to function block 922, where a remote pause event is sent, if the universal media player is synchronized with another player and, then, to function block 926 where a pause flag is set to true. Setting the pause flag to true causes the operation of the universal media player to pause. Program control then cycles to block 912. If the user has not selected the pause control, program control immediately cycles to block 904.

At decision block 924, a test is performed to determine if the media player has received a remote pause event signal. If so, program control is passed to function block 926 where the pause flag is set to true. Then, program control returns to block 904. If no remote pause event is received, program control returns immediately to block 904.

At decision block 914, a test is performed to determine if the user has selected volume control. If so, program control passes to function block 920 where a change volume flag is set to true. The universal media player then responds to volume control inputs received from the user in the manner described below. Then, program control returns to block 904. If the user has not selected volume control, program control returns immediately to block 904.

At decision block 918, a test is performed to determine if the user has selected stop control. If the user has selected stop control, program control passes to function block 924 where a remote stop event message is sent and, then, to function block 928 where the universal media player interface is deactivated. Program control then cycles to stop block 932. If the user has not selected stop control, program control returns immediately to block 904.

Figure 11:
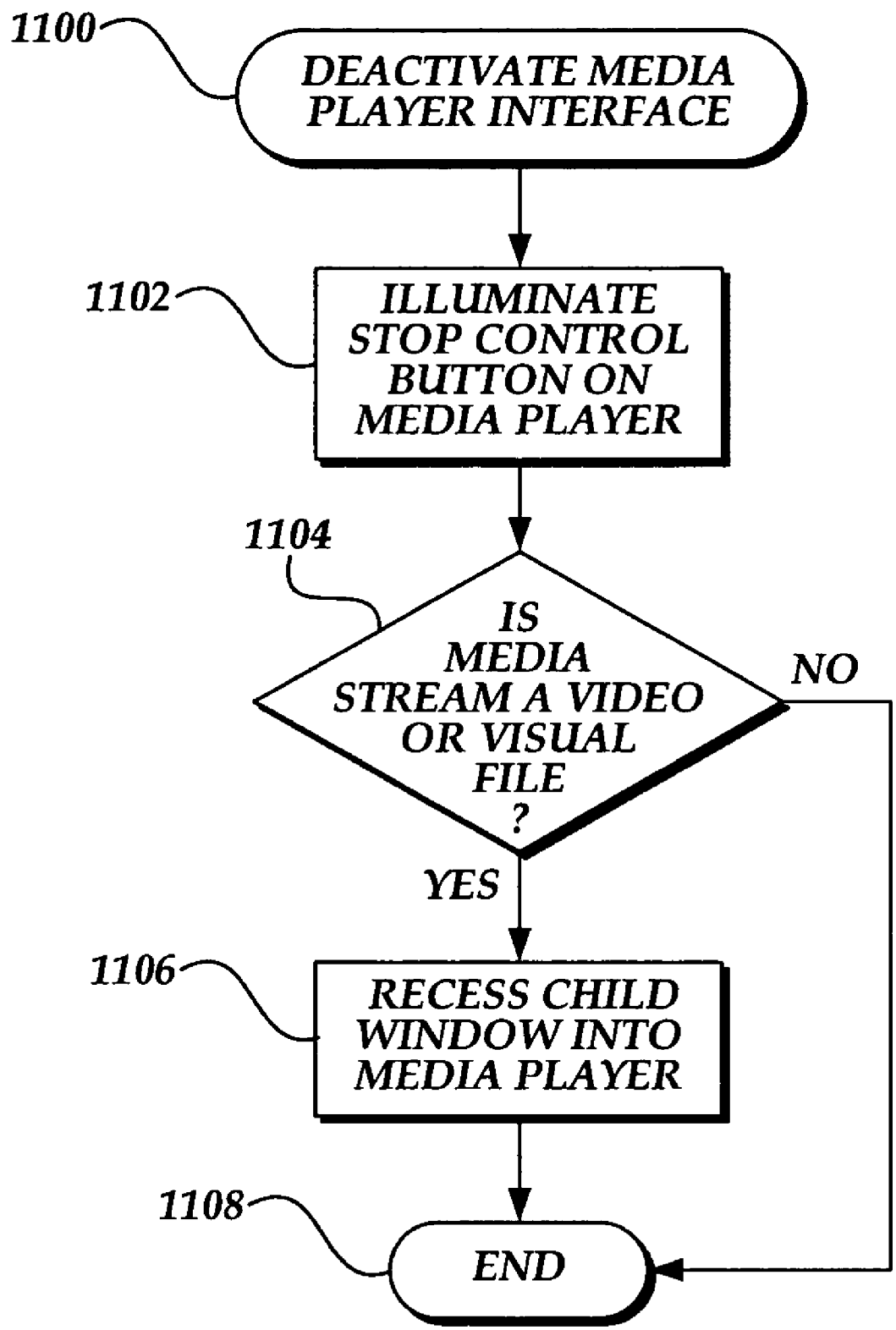
FIG. 11 is a flowchart illustrating logic for deactivating the media player interface suitable for use in FIG. 9A.

At decision block 930, a test is made to determine if the universal media player has received a remote stop event signal. If so, control is passed to function block 928 where the universal media player interface is deactivated. Processing then cycles to stop block 932. Logic illustrating the deactivation of the embedded universal media player interface is illustrated in FIG. 11 and described below.

Turning now to FIG. 9B, at decision block 934, a test is performed to determine if the user has selected next control. If so, program control passes to function block 936 where a remote next event signal is sent and, then, to function block 938 where a next flag is set to true. Setting the next flag to true causes the current media item to end and the next media item to start, such as the next song on a CD. Similar action (which is not described here) occurs when a user selects a fast forward control. Then program control returns to block 904. If the user has not selected next control, program control returns immediately to block 904.

At decision block 940, a test is made to determine if the universal media player has received a remote next event signal. If so, program control is passed to function block 938 where the next flag is set to true. Then program control returns to block 904. If the universal media player has not received a remote next event signal, control returns immediately to block 904.

At decision block 942, a test is performed to determine if the user has selected previous control. If so, program control passes to function block 944, where a remote previous event signal is sent and, then, to function block 946 where a previous flag is set to true. Setting the previous flag to true causes the current media item to end and the previous media item to start, such as the previous song on a CD. Similar action (which is not described here) occurs when the user selects a rewind control. Then, program control returns to block 912. If the user has not selected previous control, program control returns immediately to block 912.

At decision block 948, a test is made to determine if the universal media player received a remote previous event signal. If so, control is passed to function block 942 where the previous flag is set to true. Then, program control returns to block 904. If the universal media player has not received a remote signal, program control returns immediately to block 904.

Activate Media Player Interface Process

Figure 10A:
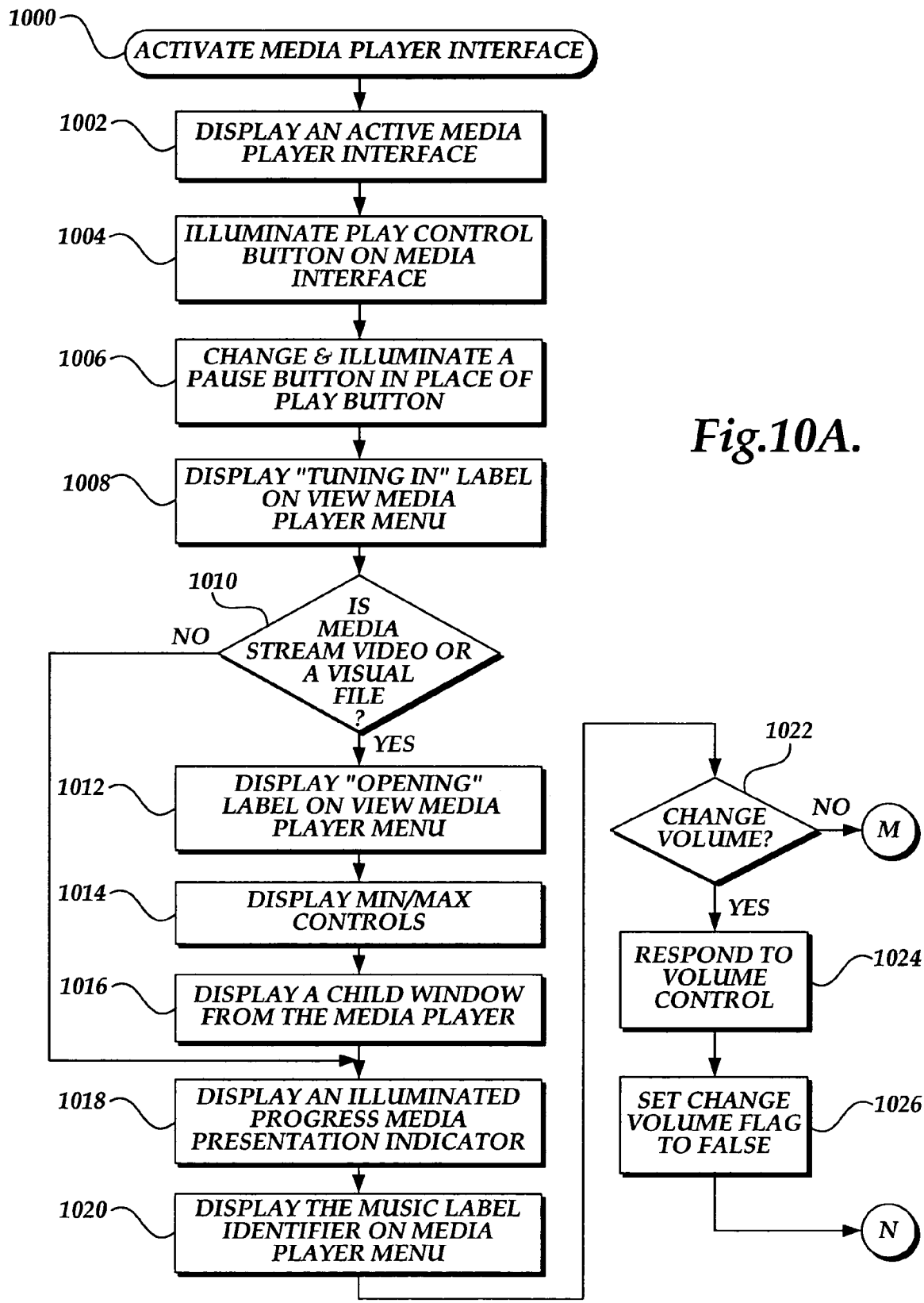
FIGS. 10A and 10B are flowcharts illustrating logic for activating the media player interface suitable for use in FIG. 9A.
Figure 10B:
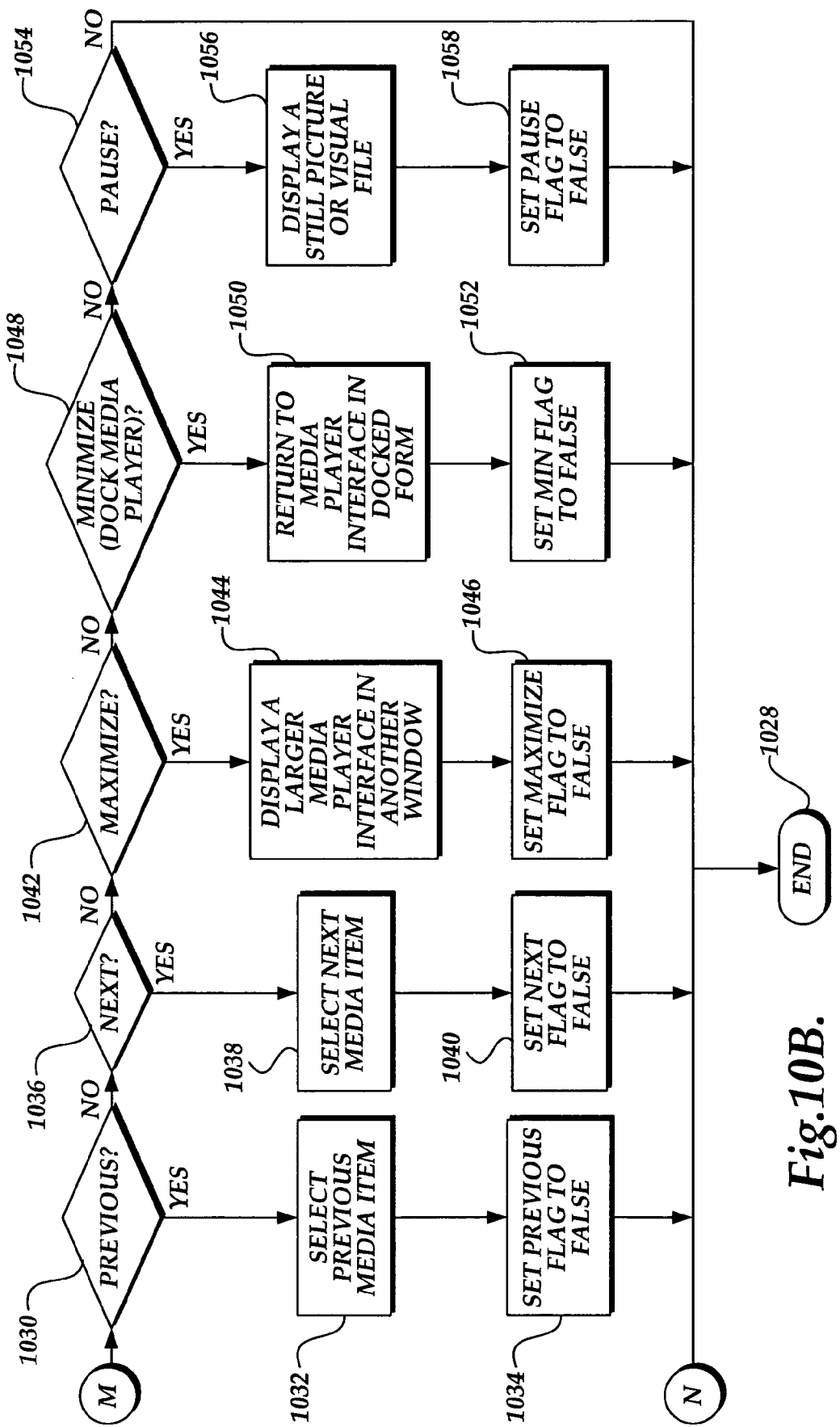

FIGS. 10A and 10B are flowcharts illustrating logic for activating the media player interface suitable for use in FIG. 9A. Processing commences at block 1000 and program control immediately passes to function block 1002 where an active media player interface is displayed and, then, to function block 1004 where the play control button on the media player interface is illuminated. From block 1004, program control continues to function block 1006 where the pause button is changed and illuminated in place of the play button. After block 1006, program control is passed to function block 1008 where a "tuning in" label is added to the menu of the universal media player interface. Then, at decision block 1010, a test is performed to determine if the media stream is a video file. Video files include video telephone calls, DVDs, and all visual files. If the media stream is not a video file, control is passed to function block 1018 causing an illuminated progress media presentation indicator to be displayed. In this case, it is not necessary to display a video screen since the media stream is only audio which includes radio stations, music files, and CDs.

If the media stream is a video file, program control is passed to function block 1012, causing an "opening" label to be displayed on a view media player menu. Program control then passes to function block 1014 causing min/max controls to be displayed and, then, to function block 1016, causing a child window to be added to the universal media player interface. Program control then cycles to function block 1018 where, as noted above, an illuminated progress media presentation indicator is displayed. Control then passes to function block 1020 where a music (or other as appropriate) label identifier is displayed on the menu of the universal media player interface.

Control is next passed through several decision blocks which determine if the user has performed selections that cause selected control button flags associated with the universal media player interface (such as volume, previous, next, minimize/maximize, pause, and stop) to be set true in the manner previously described.

At decision block 1022, a test is performed to determine if the user has selected change volume. If so, program control passes to function block 1024 where the program responds to the activated volume control on the universal media player interface. Then control cycles to function block 1026 where the change volume flag is set to false. Control then shifts to end block 1028 where processing ends.

If the test at decision block 1022 is negative, the process cycles to decision block 1030, where a test is performed to determine if the user selected previous. If so, program control is passed to function block 1032 where the universal media player selects the previous media item. Then, processing shifts to function block 1034 where the previous flag is set to false. Next, processing cycles to end block 1028 where processing ends. (As noted above, rewind, while not shown, functions in a like manner to previous.)

If the test at decision block 1030 is negative, the program control cycles to decision block 1036 when a test is performed to determine if the user selected next. See FIG. 1013. If so, program control is passed to function block 1038, where the universal media player selects the next media item. Then the process shifts to function block 1040 where the next flag is set to false. Processing then shifts to block 1028 where processing ends. (As also noted above, fast forward, while not shown, functions in a like manner to previous.)

If the test at decision block 1036 is negative, program control cycles to decision block 1042, where a test is performed to determine if the user selected maximize. If so, program control is passed to function block 1044 causing the universal media player interface to be displayed in another window larger than before. Program control then cycles to function block 1046 where the maximize flag is set to false. Next, processing shifts to block 1028 where processing ends.

If the test at decision block 1042 is negative, program control cycles to decision block 1048 where a test is performed to determine if the user has selected minimize. If so, program control is passed to function block 1050, causing the universal media player interface to return to a docked size and location (described below). Then the process cycles to function block 1052 where the minimize flag is set to false. Processing then shifts to end block 1028 where processing ends.

If the test at decision block 1048 is negative, the program control cycles to decision block 1054 where a test is performed to determine if the user has selected pause. If so, program control is passed to function block 1056, causing a still picture of a visual file or stop video output to be displayed. Then, the process cycles to function block 1058 where the pause flag is set to false. Then, processing shifts to end block 1028 where processing ends.

Deactivate the Media Player Interface

FIG. 11 is a flowchart illustrating logic for deactivating the universal media player interface suitable for use in FIG. 9A. Processing commences at block 1100 and control immediately passes to function block 1102 causing the stop control button on the media player interface to be illuminated. Then, at decision block 1104, a test is performed to determine if the media stream is a video or audio file. If the media stream is a video file, program control is passed to function block 1106, causing the child window to recess into the universal media player interface. The processing shifts to block 1108 where processing ends. If the media is an audio file, control is passed directly to function block 1108 where processing ends.

Media Player Interface

The foregoing description of a universal media player will be better understood by considering the foregoing description and FIGS. 1-11 in connection with FIGS. 12-17, which are copies of screen shots of the interface of an embedded universal media player formed in accordance with this invention.

Figure 12:
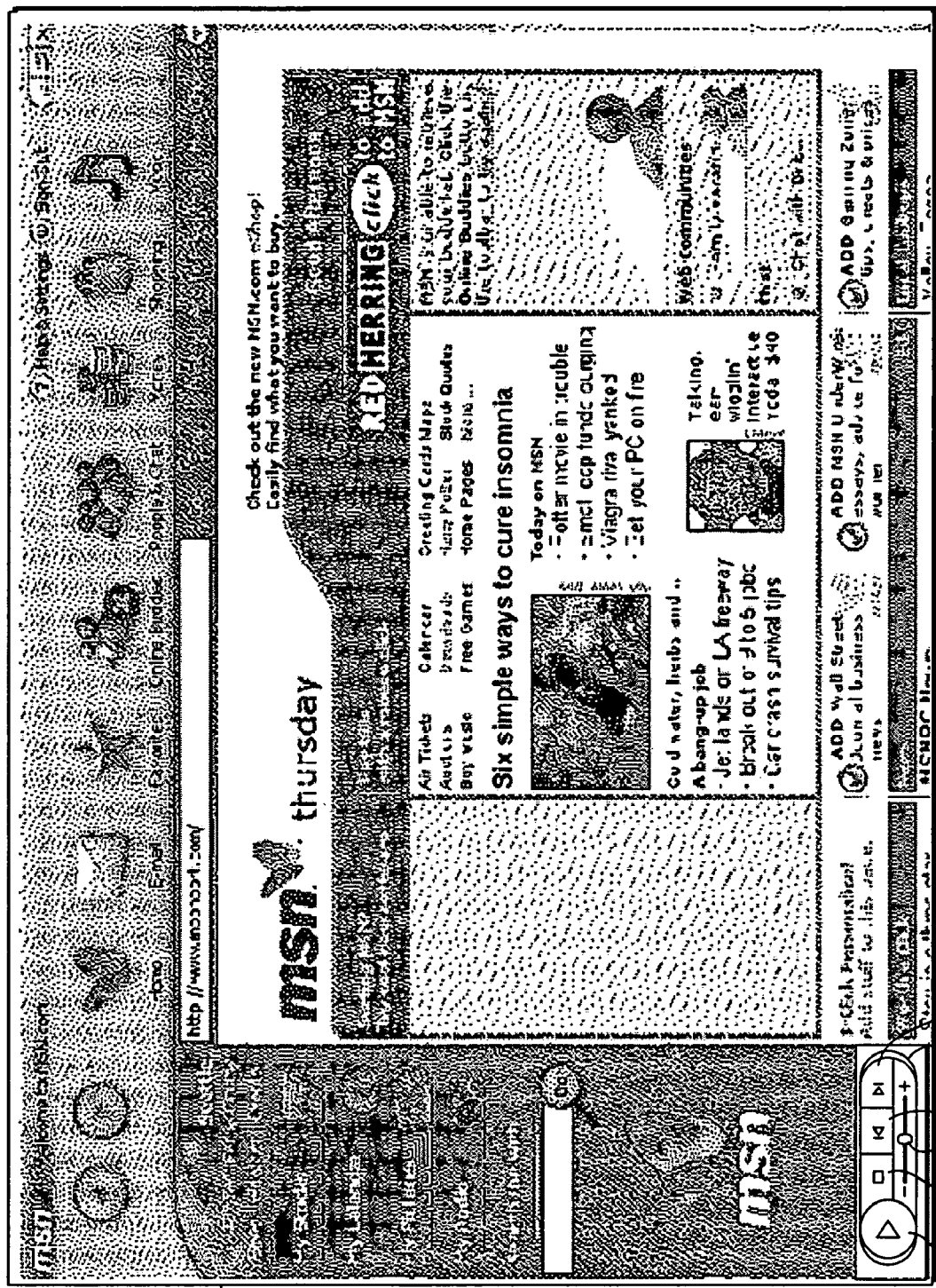
FIG. 12 is a copy of a screen shot of the interactive interface of a universal media player formed in accordance with the present invention embedded in the interface of an Internet browser.

FIG. 12 is a copy of the interface 1200 of an exemplary Internet browser including the idle interface 1202 of an embedded universal media player formed in accordance with this invention. The embedded universal media player interface 1202 is located in the frame area of the Internet browser interface 1200. The frame of an Internet browser interface is the portion of the interface that is persistent, i.e., normally shown. Other areas normally change as the Internet browser browses Internet sites. Preferably, the embedded universal media player interface provides a user with a single interface having common control buttons such as play 1204, stop 1208, volume 1206, next 1210, and previous 1212. The embedding of a universal media player in a Web browser allows a user to navigate between different sources of media without requiring the download of separate media players for each of the media sources having a different media format.

Figure 13:
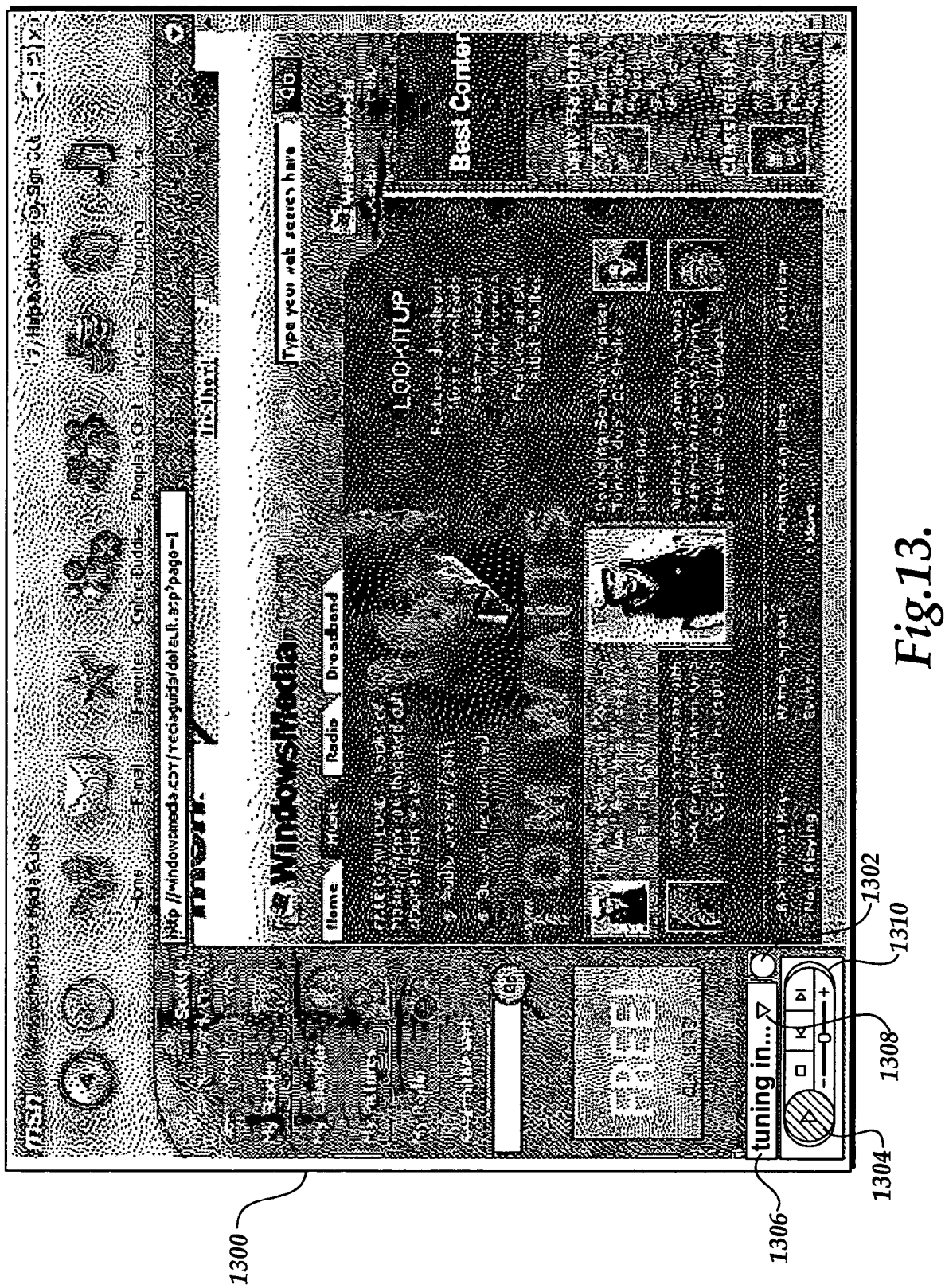
FIG. 13 is a copy of a screen shot of the active interface of a universal media player formed in accordance with the present invention embedded in the interface of an Internet browser.

FIG. 13 illustrates how the embedded universal media player interface looks when activated. More specifically, FIG. 13 illustrates an Internet browser interface 1300 with an universal media player interface 1310 similar to that shown in FIG. 12. The play control button 1304 of the illustrated universal media player interface is illuminated. Also a menu bar 1308 containing the label "tuning in" 1306 has been added to the universal media player interface. A further addition is a control 1302 that allows a user the option of launching the universal media player interface in a larger window.

Figure 14:
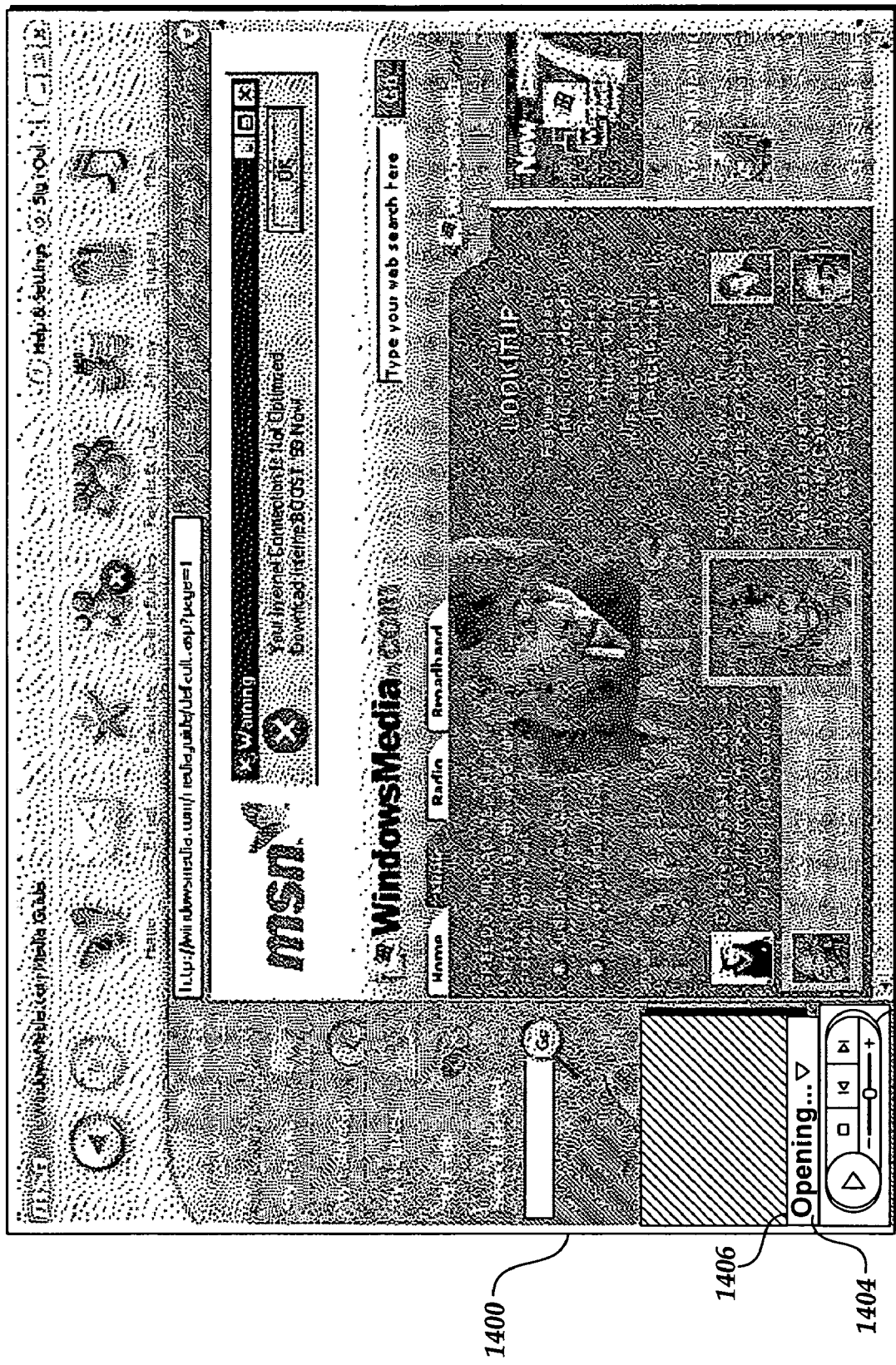
FIG. 14 is a copy of a screen shot of the interface of a universal media player of the type shown in FIGS. 12 and 13 when activated to receive a video file.

FIG. 14 illustrates how the embedded universal media player looks when activated to receive a video file. More specifically, FIG. 14 illustrates an Internet browser interface 1400 with an universal media player interface 1402. As illustrated when the universal media player is to play a video, including a video teleconference over the Internet, the universal media player interface displays an "opening" label 106 on the menu bar 1404 of the universal media player interface. In addition, a progress media presentation indicator may be displayed.

Figure 15:
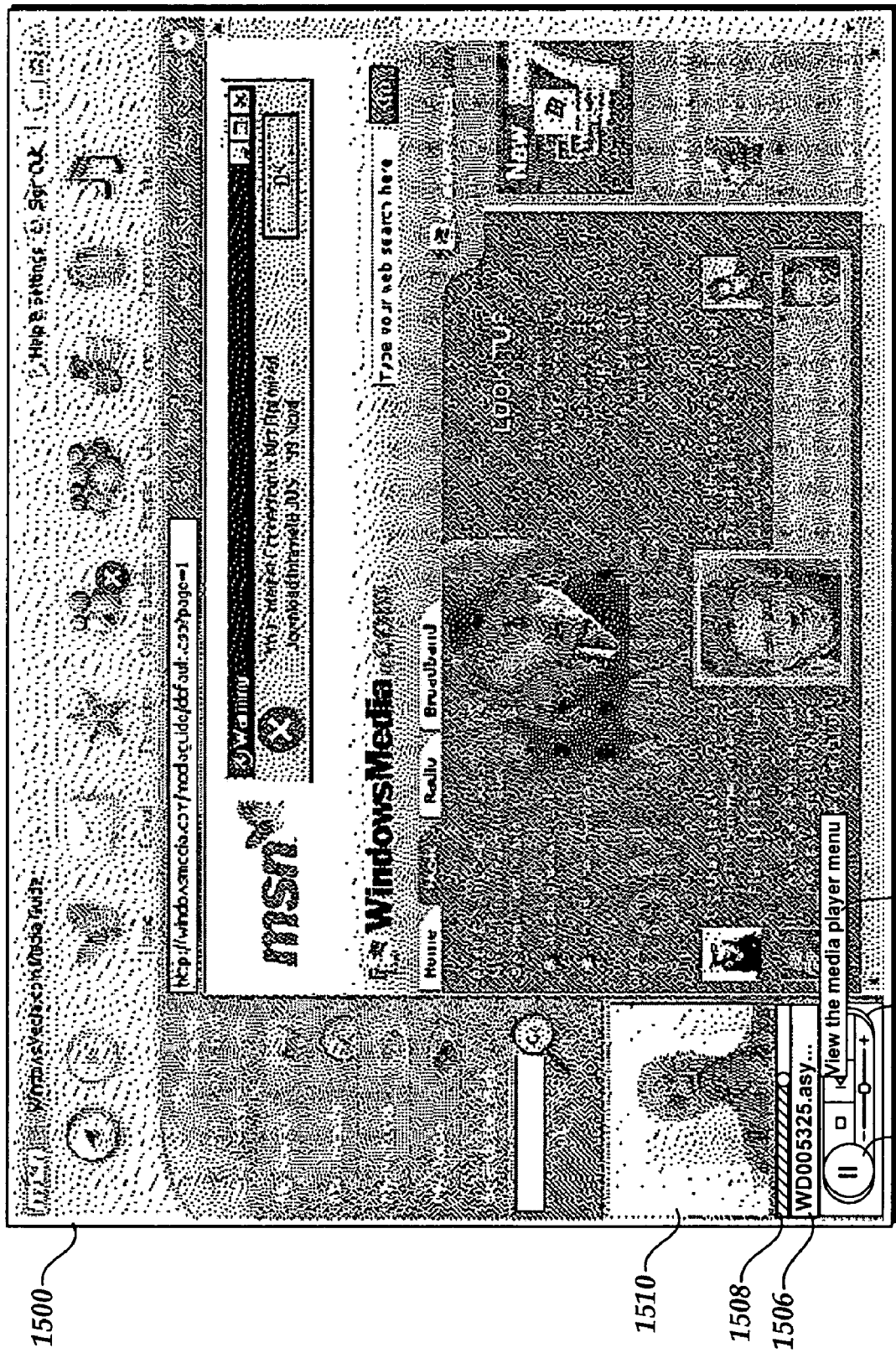
FIG. 15 is a copy of a screen shot of the interface of a universal media player of the type shown in FIGS. 12 and 13 when playing a video file.

FIG. 15 illustrates how the embedded universal media player interface looks when playing a video file. More specifically, FIG. 15 illustrates an Internet browser interface 1500 with an universal media player interface 1502 located in the frame of the Internet browser interface. In response to a user activating the universal media player with a request to play a video file, including a DVD, an Internet-derived video file, or an Internet video teleconference, the embedded universal media player interface illuminates a pause button 1504 in place of the play button, displays a label identifying the media on the media player menu bar 1506, displays an illuminated progress media presentation indicator 1508, and displays the video media in a child window 1510. Optionally, a media player menu 1512 is displayed.

Figure 16:
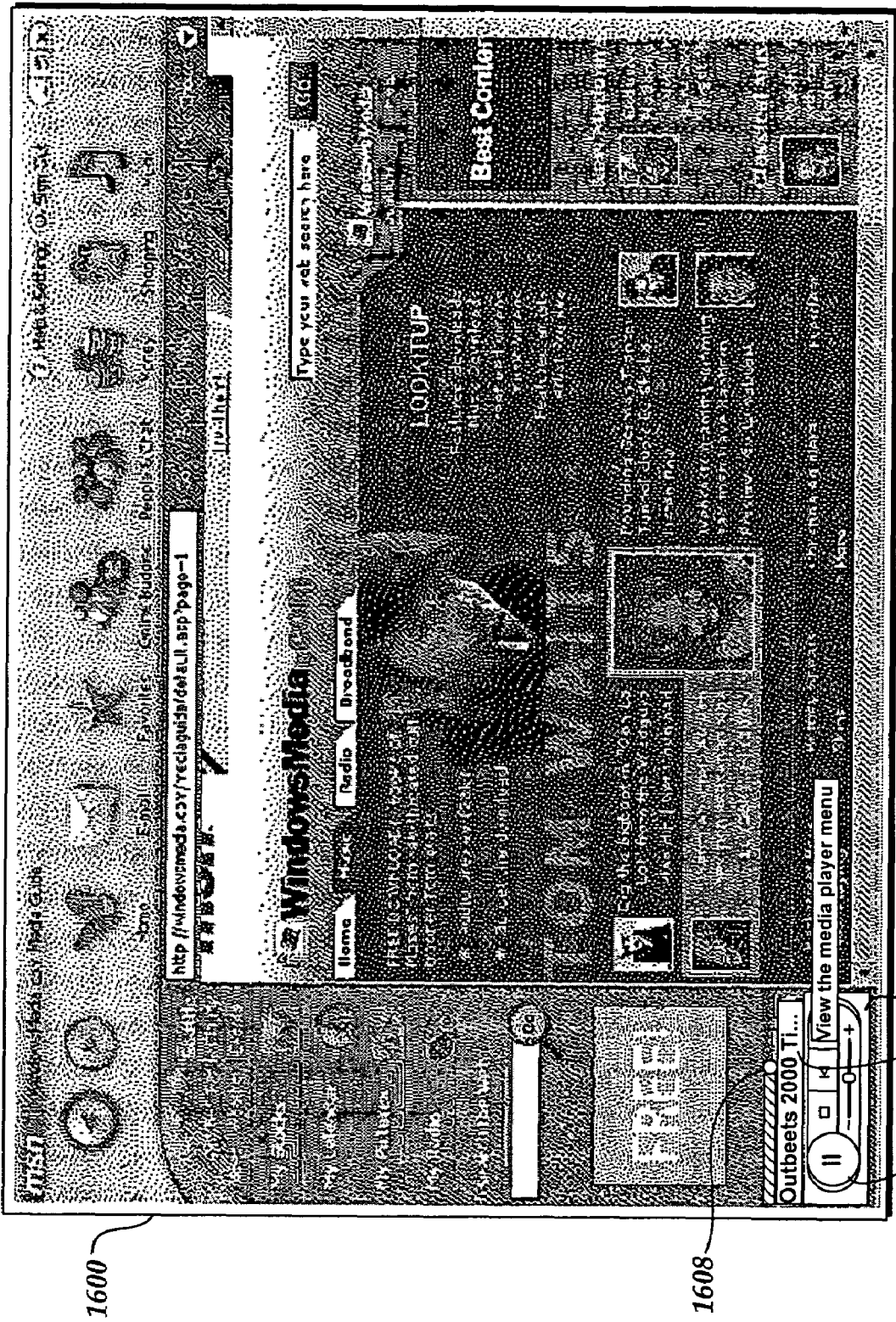
FIG. 16 is a copy of a screen shot of the interface of a universal media player of the type shown in FIGS. 12 and 13 when playing an audio file.

FIG. 16 illustrates how the embedded universal media player interface looks when playing an audio file. More specifically, FIG. 16 illustrates an Internet browser interface 1600 with an media player interface 1602 located in the frame of the Internet browser interface. When the embedded universal media player interface is playing an audio file such as a music file, a CD or a radio station, an illuminated pause button 1606 is displayed in place of the play button, a label or title identifying the media being played is displayed on the menu bar 1604, and an illuminated progress media presentation indicator 1608 is displayed.

Figure 17A:
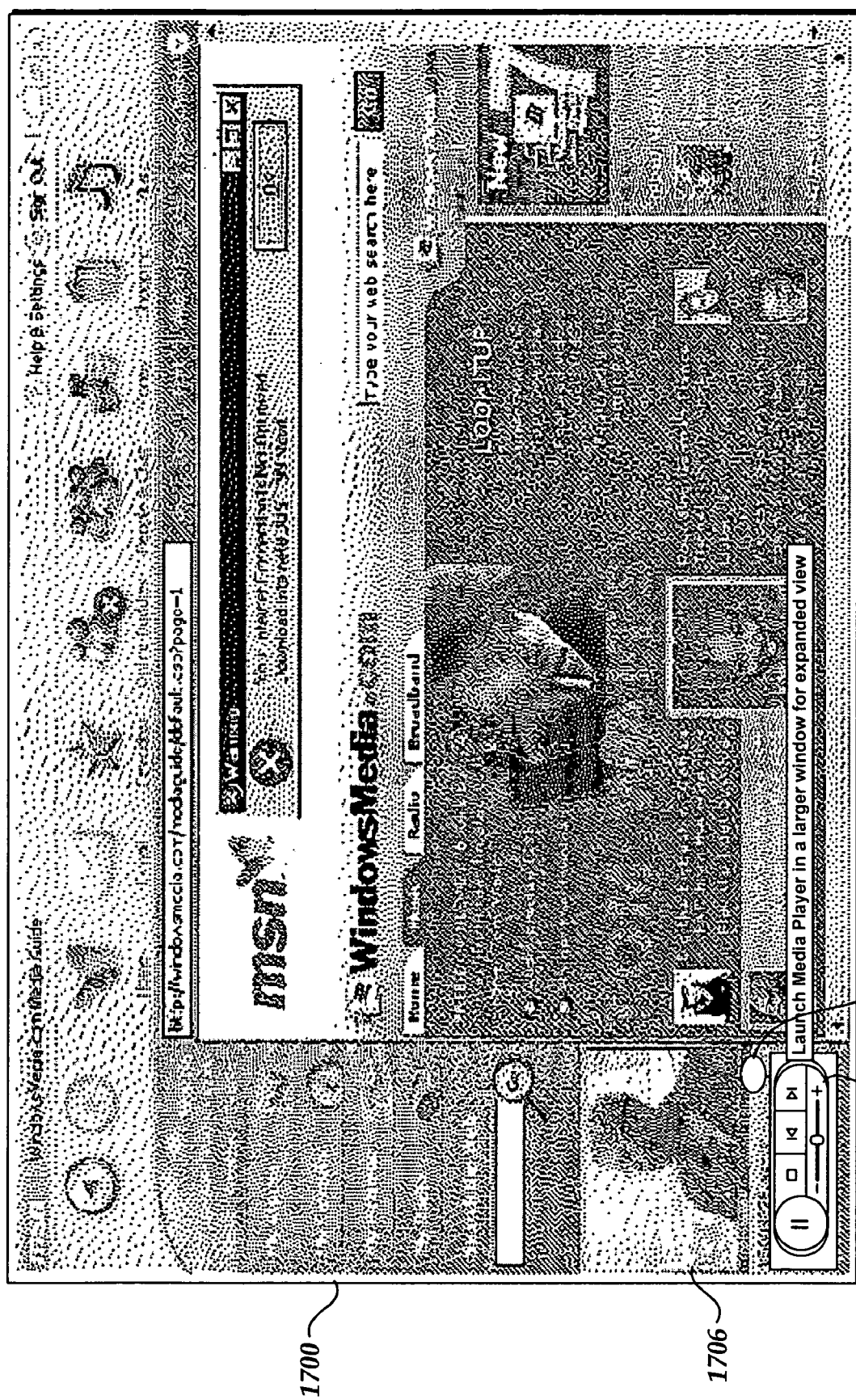
FIGS. 17A and 17B are copies of screen shots of the interface of a universal media player of the type shown in FIGS. 12 and 13 when launching the media player interface in a larger window for an expanded view.
Figure 17B:
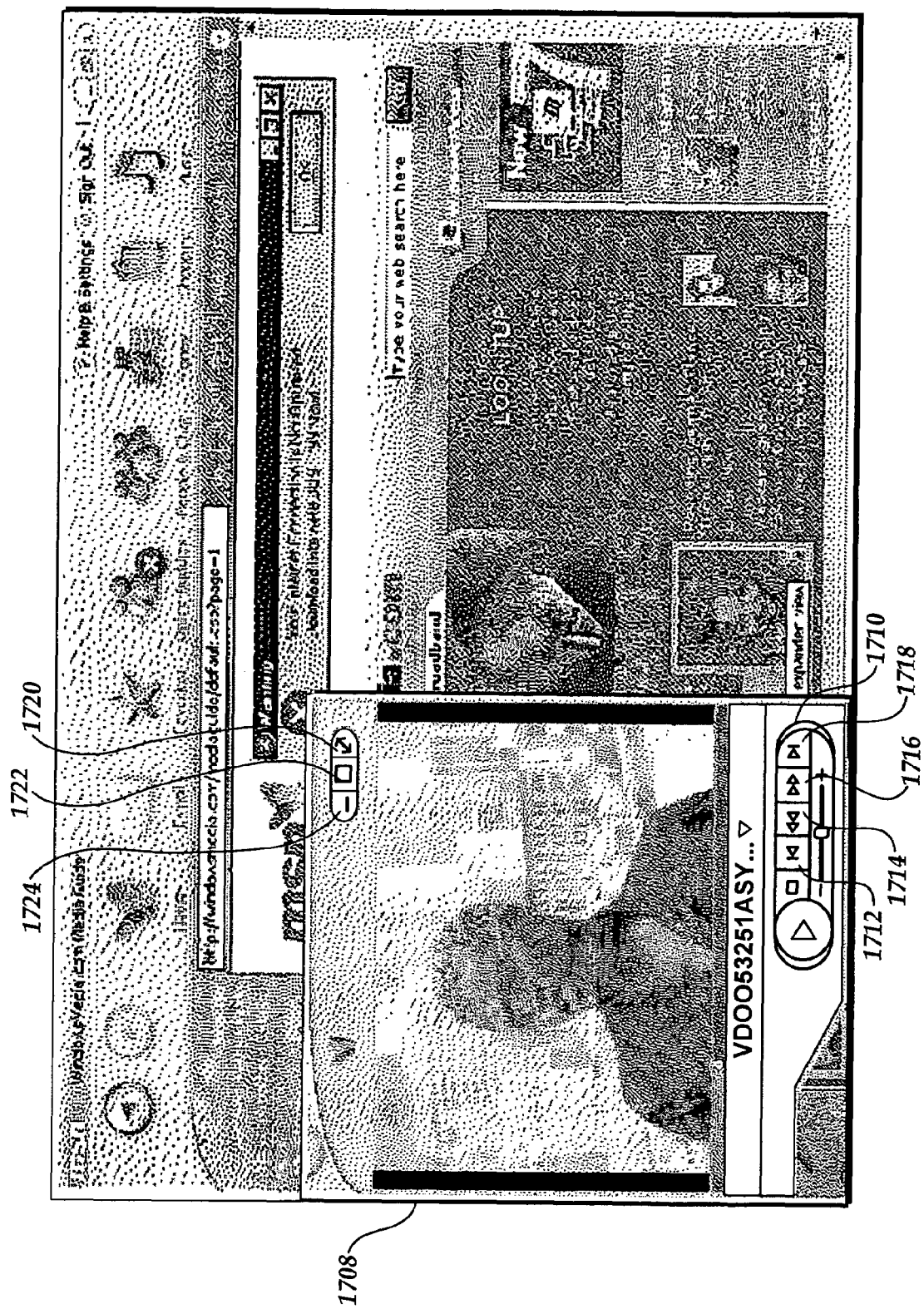

FIGS. 17A and 17B illustrate how the embedded universal media player interface changes when launching the embedded universal media player interface in a larger window for an expanded view of the video being shown. More specifically, FIG. 17A illustrates an Internet browser interface 1700 with a universal media player interface 1702 located in the frame of the browser. If the user wants to launch the media player in a larger window for expanded view of the media 1706 being viewed, the user moves a cursor over an enlarge control 1704. Clicking on the enlarge control 1704 causes the embedded universal media player interface to be launched in an enlarged window. FIG. 17B illustrates a larger size embedded universal media player interface 1708. More controls 1710 are added to allow a user to select additional options such as previous track 1712, fast rewind 1714, fast forward 1716, and next track 1718. Selection of control 1724 closes the media player interface window 1708. Selection of control 1722 causes the media player interface to expand further into a still larger window, and selection of control 1720 causes the universal media player interface to return to its normal (small) size.

While a preferred embodiment of the invention has been illustrated and described, it is to be understood that various changes can be made therein without departing from the spirit and scope of the invention as defined by the appended claims. For example, the sequence and nature of the testing of the various control functions should be taken as exemplary, not limiting. Hence, it is to be understood that the invention can be practiced otherwise than as specifically described herein.

The embodiments of the invention in which an exclusive property or privilege is claimed are defined as follows:

1. A computer-based implementable method of playing media designed for playing on various types of media players comprising:

(a) providing two universal media players being synchronized together by a selection of a uniform resource locator media link of one of the two universal media players after the one of the two universal media players being locked to the other of the two universal media players resulting in the two universal media players playing the same media, wherein each of the two universal media players includes a media player interface with user controllable buttons and the media player interface is positioned within the frame of an Internet browser at a portion of the Internet browser that does not change, the universal media players being configured to facilitate navigation between different sources of media without requiring a downloading of a media player associated with a format of a media source;
  (b) determining whether incoming media to be played is playable by one of the two universal media players by determining the media type of the incoming media and searching a table of media types including MIME media types to determine whether the media type of the incoming media is playable by one of the two universal media players; and
    (i) if the incoming media to be played is playable by one of the two universal media players, intercepting the incoming media and directing the incoming media to one of the two universal media players;
      (1) determining whether the incoming media is ready to be played;
      (2) determining whether a current media player is playing media;
      (3) when the incoming media is ready to be played, if the current media player is playing media, stopping and hiding the current media player and initializing an idle media player;
      (4) if the incoming media is ready, determining whether a time to establish connection has timed out;
      (5) when incoming media is ready to be played, displaying an activated universal media player;
      (6) directing the incoming media to the initialized idle media player; or
    (ii) if the incoming media to be played is not playable by one of the two universal media players, allowing the incoming media to enable a default media player capable of playing the incoming media.

2. The method of claim 1, further including cueing the incoming media if the incoming media is playable on the universal media player.

3. The method of claim 2, wherein cueing the incoming media includes instantiating a media component for the incoming media.

4. The method of claim 1, further comprising:
  determining whether the incoming media is ready to be played;
  when the incoming media is ready to be played, initializing an idle media player; and
  directing the incoming media to the initialized idle media player.

5. The method of claim 1, further comprising:
  determining if the universal media player is remotely synchronized with another media player; and
  if the universal media player is remotely synchronized with another media player, sending a remote navigation event to the other media player.

6. The method of claim 1, further comprising, in response to receiving a request to change the size of the universal media player interface, changing the size of the universal media player interface.

7. The method of claim 1, further comprising, in response to receiving a request to pause the incoming media, sending a remote pause event signal.

8. The method of claim 7, wherein, in response to receiving a remote pause event, pausing the playing of the incoming media.

9. The method of claim 1, further comprising, in response to receiving a request to change to a previous track of the incoming media, changing to the previous track of the incoming media.

10. The method of claim 1, further comprising, in response to receiving a request to advance to the next track of the incoming media, sending a remote next event signal.

11. The method of claim 1, further comprising, in response to receiving a remote previous event, changing to a previous track of the incoming media.

12. The method of claim 1, further comprising, in response to receiving a request to advance to a next track of the incoming media, advancing to a next track of the incoming media.

13. The method of claim 12, wherein, in response to receiving a request to advance to the next track of the incoming media, sending a remote next event signal.

14. The method of claim 1, further comprising, in response to receiving a remote next event, changing to the next track of the incoming media.

15. The method of claim 1, further comprising, in response to receiving a request to stop playing the incoming media, deactivating the media player to stop playing the incoming media.

16. The method of claim 15, wherein, in response to receiving a request to stop playing the incoming media, sending a remote stop event signal.

* * * * *